US010403015B2

(12) United States Patent
 Asente et al.

(10) Patent No.: US 10,403,015 B2
(45) Date of Patent: Sep. 3, 2019

(54) INTERACTIVE GENERATION OF PROCEDURAL ORNAMENTS

(71) Applicant: ADOBE INC., San Jose, CA (US)

(72) Inventors: Paul John Asente, Redwood City, CA (US); Jingwan Lu, Santa Clara, CA (US); Lena Edith Elfriede Gieseke, Stuttgart (DE)

(73) Assignee: Adobe Inc., San Jose, CA (US)

( * ) Notice: Subject to any disclaimer, the term of this patent is extended or adjusted under 35 U.S.C. 154(b) by 53 days.

(21) Appl. No.: 15/288,999

(22) Filed: Oct. 7, 2016

(65) Prior Publication Data

US 2018/0101972 A1   Apr. 12, 2018

(51) Int. Cl.
 *G06T 11/60* (2006.01)
 *G06T 11/00* (2006.01)
(52) U.S. Cl.
 CPC ............ *G06T 11/60* (2013.01); *G06T 11/001* (2013.01)
(58) Field of Classification Search
 None
 See application file for complete search history.

(56) References Cited

U.S. PATENT DOCUMENTS

2013/0127868 A1* 5/2013 Asente ................. G06T 11/203
                                                        345/441
2013/0132874 A1* 5/2013 He ....................... G06F 3/04817
                                                        715/765

OTHER PUBLICATIONS

Anderson D.R., "Two-Dimensional Computer-Generated Ornamentation Using a User-Driven Global Planning Strategy", MS Thesis, California Polytechnic State University—San Luis Obispo, 2007.*
Ijiri et al, "An Example-based Procedural System for Element Arrangement" Eurographics, pp. 429-436, 2008.*
Wong et al, "Computer-Generated Floral Ornament", SIGGRAPH, pp. 423-434, 1998.*
Anderson et al, "User Driven Two-Dimensional Computer-Generated Ornamentation", ISVC 2008, pp. 604-613, 2008.*
AlMeraj et al, "Patch-Based Geometric Texture Synthesis", CAe 2013, pp. 15-19, Jul. 2013.*
Whitehead J, "Toward Procedural Decorative Ornamentation in Games", PCGames 2010, Jun. 2010.*

(Continued)

*Primary Examiner* — Kee M Tung
*Assistant Examiner* — Patrick F Valdez
(74) *Attorney, Agent, or Firm* — Shook Hardy & Bacon, L.L.P.

(57) ABSTRACT

A procedural model enables a user to configure a global space organization function for the generation of decorative ornaments. The user provides data to seed the generation of the ornaments, as well as localized interactive edits to the generated ornaments. The procedural model iteratively places decorative elements at a subset of locations within an ornament area (or domain) based on generalized placement functions employed by the global space organization function. As such, the user is enabled to interactively generate and edit decorative ornaments via configuring the global space organization function and employing editing tools. Such functionality significantly decreases the effort typically required to generate ornate ornaments, while retaining control of the aesthetic organization and structure of the ornament. The generalized placement functions and heuristics of the global space organization function enable such control.

20 Claims, 14 Drawing Sheets

(56) References Cited

OTHER PUBLICATIONS

Anderson et al ("User Driven Two-Dimensional Computer-Generated Ornamentation", ISVC 2008, Part I, LNCS 5358, pp. 604-613, 2008) (Year: 2008).*

Wong, M. T., Zongker, D. E, & Salesin, D. H. (Jul. 1998). Computer-generated floral ornament. In Proceedings of the 25th annual conference on Computer graphics and interactive techniques (pp. 423-434). ACM.

Chen, G., Esch, G., Wonka, P., Müller, P., & Zhang, E. (Aug. 2008). Interactive procedural street modeling. In ACM transactions on graphics (TOG) (vol. 27, No. 3, p. 103). ACM.

Xu, L., & Mould, D. (Oct. 2015). Procedural tree modeling with guiding vectors. In Computer Graphics Forum (vol. 34, No. 7, pp. 47-56).

Beneš B., Šťava, O., Měch, R., & Miller, G. (Apr. 2011). Guided procedural modeling. In Computer graphics forum (vol. 30, No. 2, pp. 325-334). Blackwell Publishing Ltd.

Maharik, R. I. (2011). Digital micrography (Doctoral dissertation). University of British Columbia. 98 pages.

\* cited by examiner

INTERACTIVE GENERATION OF PROCEDURAL ORNAMENTS

BACKGROUND

Throughout history, humans have added decorative ornaments to various objects such as books, documents, architectural structures, literary and musical manuscripts, works of art, and the like. The complexity of the structure of such ornaments can be significant. Typically, as the complexity of an ornament increases, the manual effort required by an artist to generate the ornament likewise increases.

Furthermore, at least partially due to the widespread adoption of digital technologies, such as desktop and mobile computing, the generation rate of artifacts, such as documents, that may be adorned or decorated with such ornaments has dramatically increased. For instance, desktop publishing, word processing, and computer-aided design (CAD) tools have greatly democratized the ability to produce objects, such as digital documents, that may be decorated with ornaments. Accordingly, the number of documents to be decorated has increased dramatically, yet designing decorative ornaments can be time consuming and tedious, or lacks user control.

SUMMARY

Embodiments of the present invention are directed towards employing a configurable procedural model to automatically generate decorative ornaments. The ornaments are generated within an ornament area. The procedural model iteratively determines a subset of locations included in the ornament area based on a global space organization function. To generate the ornament, the procedural model places one or more decorative element at each of the locations included in the subset of locations. The global space organization function of the procedural model enables a user to configure placement policies for the decorative element by employing one or more control layers, generalized placement functions, heuristics, and the like. Virtually any control layers, placement functions, and/or heuristics may be employed such that the generation of the ornament is fully user configurable. The user may apply individual localized edits to the generated ornament to more fully control the structure of the ornament.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

DETAILED DESCRIPTION

Figure 1A:
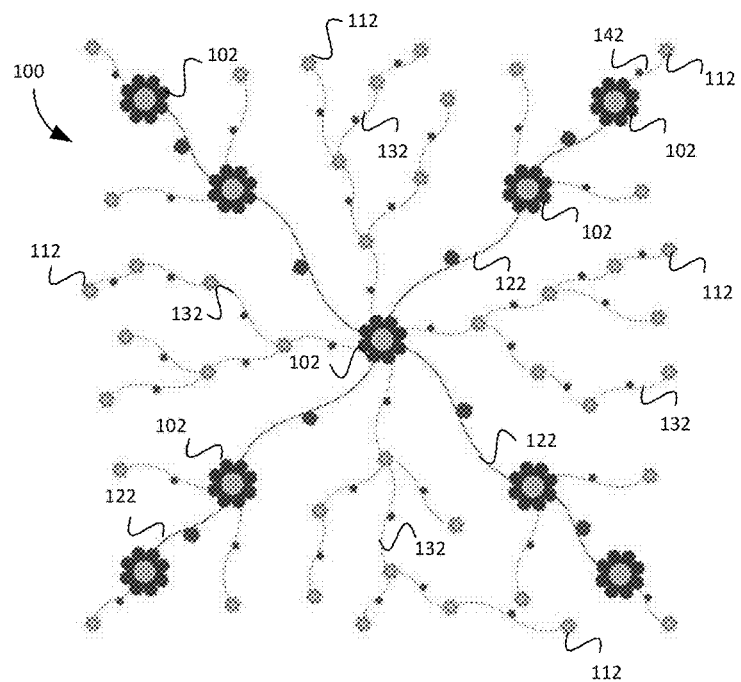
FIG. 1A illustrates an exemplary embodiment of an ornament generated with a procedural model that is consistent with the various embodiments presented herein.

With the advances in technology, decorative ornaments are increasingly used to adorn various documents. The complexity of the structure of such ornaments, however, can be significant. Typically, as the complexity of an ornament increases, the manual effort required by an artist to generate the ornament likewise increases. Currently, to reduce the manual effort required by an artist, ornaments can be generated without requiring the artist to position or specify each aspect or detail within the ornament. In particular, elements that make up an ornament are placed to provide an artistic appearance. To do so, an iterative process is used that places an element in a position at which another element is not already placed. In such an implementation, however, an artist does not have control over placement of elements to generate the ornament.

Accordingly, embodiments of the present invention are directed to employing a configurable procedural model to automatically generate decorative ornaments. In this regard, a user can control the aesthetic and/or structure of the ornaments. Generally, the ornaments are generated within an ornament area. The procedural model iteratively determines a subset of locations included in the ornament area based on a global space organization function. A global space organization function of the procedural model enables a user to configure placement policies for the decorative elements by employing one or more control layers, generalized placement functions, heuristics, and the like. Virtually any control layers, placement functions, and/or heuristics may be employed such that the generation of the ornament is fully user configurable. To generate the ornament, the procedural model places decorative elements at each of the locations included in the subset of locations. Upon an initial placement of at least a portion of the decorative elements, the user may apply individual localized edits to the generated ornament to more fully control the structure of the ornament.

Various embodiments are discussed throughout in conjunction with FIGS. 1A-9. However, briefly here, the various embodiments include a procedural model that enables at least the partially automated generation of one or more decorative ornaments. A user may employ the ornaments to decorate virtually any object or artifact, such as but not limited to one or more digital documents. Such digital documents may include, but are not otherwise limited to textual data documents, image data documents, multimedia data documents, webpages, social network feeds, desktop environments, dashboards, letterheads, digital watermarks, other marks, such as but not limited to branding marks, and the like.

A global space organization function enables a user to configure a procedural model for the generation of one or more ornaments. Further, the global space organization function can define a hierarchy of decorative elements that are included in the ornaments, provide seed location or other data to seed the generation of the ornaments, and provide localized interactive edits to the generated ornaments. As discussed herein, an ornament may be generated within an area that includes a plurality of locations. The configured procedural model iteratively places decorative elements at a subset of the locations within the area.

Such functionality enables the user to generate complex and/or ornate ornaments, while controlling and interactively tuning, modifying, and/or updating the aesthetic and/or structure of the ornament. Such functionality also significantly decreases the effort and/or user interactivity typically required to generate such ornate ornaments, while retaining control of the global aesthetic organization and/or structure of the ornament.

Various embodiments enable a user to employ one or more global space organization functions to control the procedural model in the generation of ornaments. A global space organization function guides the procedural model and may be based on or employ one or more control layers. A control layer may receive various user inputs, such as but not limited to flow fields, user sketches, image data, and the like. In at least one embodiment, the global space organization function may be based on information included in image data, such as but not limited to image brightness, edges within the image data, textual information included in the image data, and the like.

In the context of a flow field as an input to the global space organization function, the procedural model may retrieve flow field characteristics, such as a local direction for any point in the ornament space. Based on the direction of the flow field, the procedural may locally adjust and/or adapt the growth of the ornament. In at least one embodiment, the adaption may include aligning structural elements to the flow field orientation.

The configured global space organization function may determine and/or detect one or more streamlines in the flow field and assign each streamline a fitness function. Such a fitness function may be indicative of the fitness in growing along that streamline. Accordingly, the model may enable the categorization of streamlines to iteratively determine a best (in a fitness sense) growth of the ornament along one or more streamline based on the model's fitness function.

As noted above, the user may configure a global space organization function to guide the procedural model. In one exemplary embodiment, the user may provide one or more hierarchies of decorative elements and configure global constraints and/or controls for the generation of the ornament. Such decorative element hierarchies may include a structured hierarchy of elements that are included in the generated ornament. For instance, one or more of the decorative elements included in an element hierarchy may be a foreground element, while other decorative elements included in the hierarchy may be background elements.

Such configuration of a procedural model may include, but is not otherwise limited to, configuring one or more placement policies. A placement policy may employ one or more global space organization functions. The global space organization function may employ placement functions, control layers, image data, and the like. Such control mechanisms may be provided as user input. For instance, a global space organization function may employ a placement function to convert brightness information within image data to determine the iterative placement of decorative elements. Other exemplary embodiments of placement functions may employ control layers that includes streamlines to determine the iterative placement of decorative elements.

Thus, a placement policy may consult one or more global space organization functions to guide the placement of decorative elements. For instance, the procedural model may place an element at the point where a global space organization function provides a maximal value. Alternatively, the procedural model may employ the result of a global space organization function to determine an element's size, orientation, color, opacity, shape, or other such attributes. One aspect may include a variation of the element. For instance, a flower-like element may be open or closed based on the global space organization function. Any aspect or attribute of placed elements may be controlled by a generalized global space orientation function.

The configuration of such global space organization functions requires little effort from the user. Based on these global space organization functions, various embodiments of the procedural model automatically generate one or more ornaments that conform to the user's desired aesthetic.

The placement policies may employ one or more global space organization functions that may include at least one of one or more placement functions, control layers, and/or placement image data. A global space organization function may provide, for any point in space, information on how the procedural model places decorative elements at that point. The information may include a desirability of placing an element at the point, and information affecting the element places at the point, such as its size, orientation, or color. As noted above, a global space organization function may include at least one or more individual placement functions.

In contrast to other procedural models that may iteratively place elements based solely on maximizing the distance between and element to be places and one or more previously placed elements, the various global space organization functions described herein may be based on virtually any selective placement criteria to generate ornaments with any desired decorative aesthetic. Accordingly, the various embodiments may include fully customizable and modularly combinable global space organization functions to fulfill global design constraints.

Additionally and/or alternatively, an individual global space organization function may include one or more factors based on a distance from one or more elements already included in the ornament or a distance to a boundary or obstacle included in the ornament. Placement heuristics enable the user to control the placement of elements in the ornament, when one or more indeterminacies and/or degenerate placement conditions occur. As discussed below, placement image data may be employed to determine the placement of at least a portion of the elements included in an ornament.

Global space organization functions may be employed to determine one or more connection paths or connection streamlines to constrain the placement of and/or connections between elements included in an ornament. Such global space organization functions may include one or more connection heuristics that further control the connection between elements. As discussed throughout, various embodiments of control layers may include one or more anchor points, masks, stencils, or other such obstacles that further control the connections between the elements. Image data may be employed to constrain the connections between the elements.

A global space organization function may resolve collisions with an obstacle, such as but not limited to a mask or stencil. A particular placement function may provide an alternative placement of such decorative elements to avoid the collision. Accordingly, a global space organization function may enable one or more shortest path processes to determine an alternative placement or path for the decorative element. The one or more shortest path processes may be employed such that the placement of and/or connections between one or more decorative elements avoid collisions with one or more obstacles included in the connection policies. The shortest path processes may employ one or more movement cost functions to determine the shortest path to avoid an obstacle.

In at least one embodiment, and as discussed herein, a shortest path process may be a modified shortest path process that employs a modified movement cost function. A modified shortest path processes generates a modified path around one or more obstacles. Although not an optimized shortest path, the modified path around one or more obstacles may be more decorative and/or visually appealing than an optimized shortest path. Accordingly, such modified movement cost functions may generate an ornament that includes an aesthetic that is more consistent with the user's intentional design.

Through one or more user interfaces (UIs), the user may intuitively provide the placement of one or more "initial" elements (seed data), from which the ornament "grows" or "evolves" based on the global controls. Such user configurable global controls and/or user provided seed data may further include at least one of one or more paths, vector fields, obstacles, anchor points, and the like, which further constrains and/or controls the growth or evolution of the ornament. The growth or evolution may be based on the connection policies. For instance, employing the UI, the user may provide curves or vector fields that are used to update the one or more global space organization functions. As such, the UI enables a translation of visual input into the global space organization function. Thus, the global space organization function may be employed uniformly across the ornament.

As mentioned above, the growth or evolution of the ornament may be further constrained by one or more stochastic and/or random processes, which may provide a somewhat "organic" aesthetic when combined with the more deterministic global controls. For instance, a placement or connection in the ornament may randomly deviate from that, as determined by a placement function, based on one or more random and/or pseudo-random processes carried out by the procedural model. The UI may enable a user to control and/or configure the employment of such stochastic processes. The growth or evolution of the ornament may be terminated based on or more termination policies included in the global controls.

To achieve even greater control of the aesthetic and upon termination of the growth or evolution process, the user may provide local edits to generated ornament, via the one or more intuitive UIs. Such local edits may include at least one of an insertion or deletion of an element into/from the ornament. In at least one embodiment, a local edit may include modifying and/or updating the position and/or a connection of one or more elements included in the ornament.

At least one embodiment of a procedural model ensures that the structure of the ornament is consistent with both the user provided local edits and the global space organization function. For instance, upon receiving local edits from the user, at least one embodiment of a procedural model may further update and/or modify the ornament such that the updated and/or modified ornament is constrained by the global space organization function, while including the local edits. The user may iteratively provide additional local edits to the updated and/or modified ornament. Accordingly, the user may interactively provide design feedback to provide even greater control of the overall aesthetic of ornament.

FIG. 1A illustrates an exemplary embodiment of an ornament 100 generated with a procedural model that is consistent with the various embodiments presented herein. Ornament 100 includes a plurality of instances of decorative elements included in an element hierarchy that includes foreground elements, background elements, and connection elements between the elements. Many of the embodiments discussed herein include decorative elements that resemble plants and/or flowers. However, other embodiments are not so constrained, and the ornaments generated by the various embodiments of the procedural models discussed herein may not include plant-like ornaments. For instance, the decorative elements included in an element hierarchy may include virtually any element type, including but not limited to geometric shapes, patterns, symbols, icons, text, or the like.

Furthermore, various embodiments discussed herein are directed towards the generation of 2D ornaments, such as but not limited to ornament 100. That is to say, ornament 100 (and the decorative elements included within) extend in two spatial dimensions. However, it should be noted that other embodiments are not so constrained. For instance, the various procedural models discussed herein may be generalized to generate ornaments that extend in three (or more) spatial dimensions. Additionally, the decorative element hierarchy may include three-dimensional (3D) (or higher) decorative elements.

At least a portion of the foreground elements included in ornament 100 includes foreground elements that resemble a larger flower. A portion of the instances of foreground elements are indicated in FIG. 1A as foreground elements 102. At least a portion of the background elements included in ornament 100 includes background elements that resemble a smaller flower. A portion of the instances of such background elements are indicated in FIG. 1A as background elements 112.

Connection elements connecting one foreground element 102 to another foreground element 102 resemble vines, a portion of instances of these foreground-to-foreground connection elements are indicated as connection elements 122. Connection elements connecting one foreground element 102 to a background element 112 also resemble vines, a portion of instances of these foreground-to-background connection elements are indicated as connection elements 142. Connection elements connecting one background element 112 to another background element 112 also resemble vines, a portion of instances of these background-to-background connection elements are indicated as connection elements 132. Foreground elements 102, background elements 112, and connection elements 122/132/142 may be structured in one or more decorative element hierarchies employed by various embodiments of the procedural models discussed here.

Figure 1B:
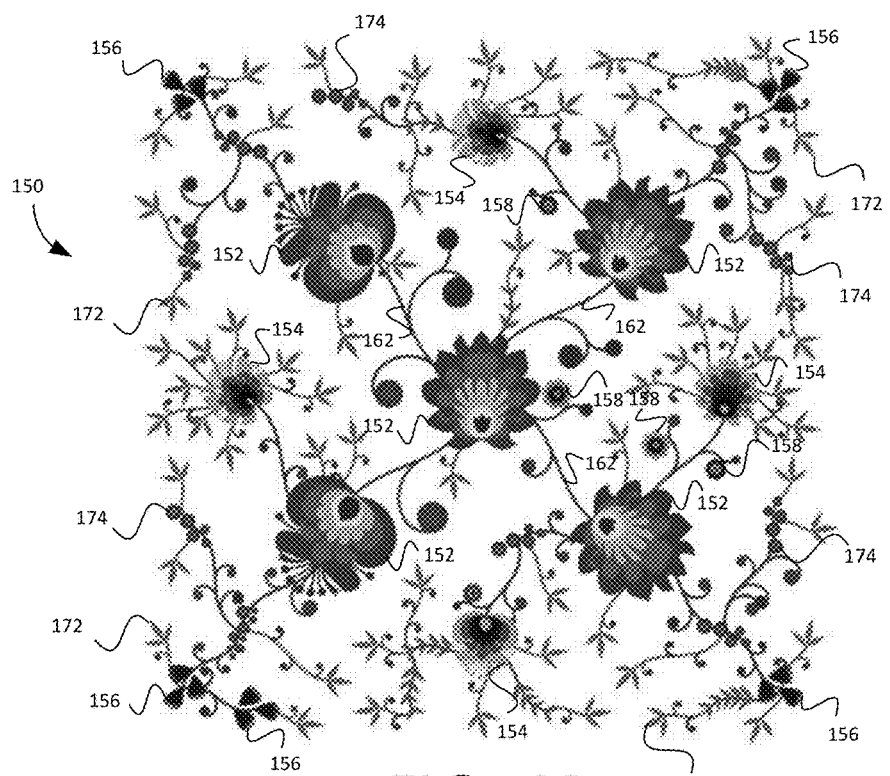
FIG. 1B illustrates another exemplary embodiment of an ornament generated with a procedural model that is consistent with the various embodiments presented herein.

FIG. 1B illustrates another exemplary embodiment of an ornament 150 generated with a procedural model that is consistent with the various embodiments presented herein. Similar to ornament 100 of FIG. 1A, ornament 150 includes foreground elements, background elements, and connection elements arranged in one or more element hierarchies. The foreground elements include multiple types of foreground elements, some instances of which are indicated in FIG. 1B as foreground elements 152/154/156/158. Note, foreground elements 152/154/156/158 may be arranged in a foreground element hierarchy based on size, shape, color, or any other such properties. The background elements include multiple types of background elements, some instances of which are indicated in FIG. 1B as background elements 162. The connection elements include multiple types of connection elements, some instances of which are indicated in FIG. 1B as connection elements 172/174. Note, connection elements 172/174 may be arranged in a connection element hierarchy based on size, shape, color, or any other such properties. For instance, a connection element hierarchy may be based on whether a connection is a foreground-to-foreground connection element, a foreground-to-background connection element, or a background-to-background connection element.

Figure 2:
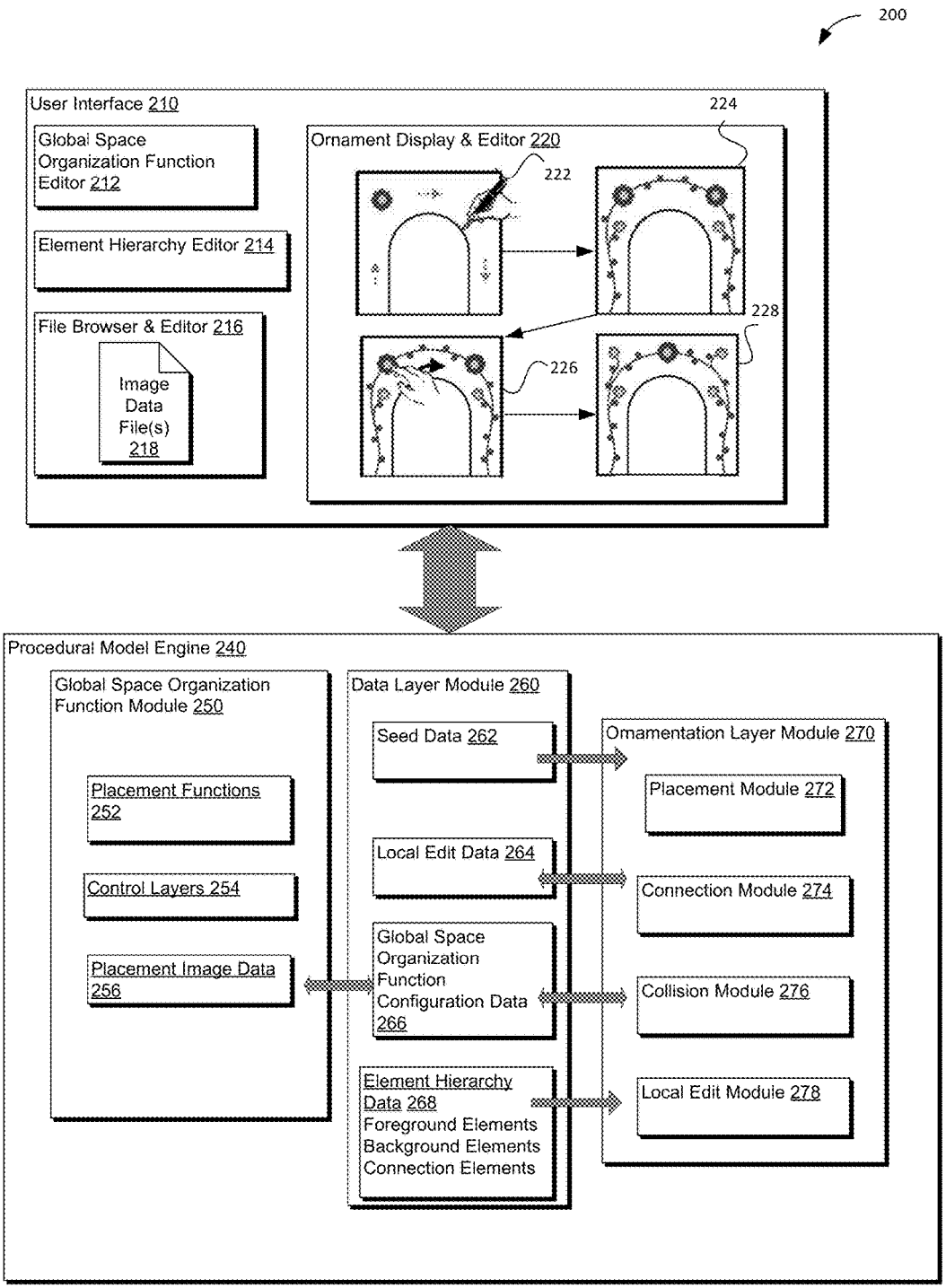
FIG. 2 depicts a system implementing various embodiments of procedural models that are consistent with the various embodiments presented herein.

FIG. 2 depicts an environment, platform, or system 200 implementing various embodiments of procedural models that are consistent with the various embodiments presented herein. In various embodiments, system 200 includes one or more user interfaces (UIs), such as but not limited to UI 210. System 200 may include further one or more engines, such as procedural model engine 240. In at least one embodiment, procedural model engine 240 may enable, perform, or otherwise execute one or more processes (or portions thereof) that perform actions that at least partially implement one or more procedural models to generate one or more ornaments. Accordingly, procedural model engine 240 may include one or more decorative ornament generation engines.

In an exemplary, but non-limiting embodiment, procedure model engine 240 may include one or more functional or abstracted software layers, such as but not limited to at least one of a global space organization function layer, a data layer, or an ornamentation generation layer. The various layers may be enabled or implemented by one or more modules, components, or sub-systems. For instance, the global space organization function layer may be implemented by global control function layer module 250, the data layer may be implemented by data layer module 260, and the ornamentation layer be implemented by ornamentation layer module 270.

The ornamentation layer, via ornamentation layer module 270, may enable, perform, or otherwise execute one or more processes (or portions thereof) that perform actions that at least partially generate decorative ornaments, such as but not limited to ornaments 100 and 150 of FIGS. 1A and 1B respectively. Thus, at least ornamentation layer module 270 may be included within one or more decorative ornament engines. As such, ornamentation layer module 270 may include at least one of placement module 272, connection module 274, collision module 276, or local edit module 278.

Placement module 272 may enable, perform, or otherwise execute one or more processes (or portions thereof) that perform actions that at least partially place one or more decorative elements during the generation of an ornament. Connection module 274 may enable, perform, or otherwise execute one or more processes (or portions thereof) that perform actions that at least partially provide one or more connections between the placed decorative elements during the generation of the ornament. Collision module 276 may enable, perform, or otherwise execute one or more processes (or portions thereof) that perform actions that at least partially determine the placement or connections of decorative element in the vicinity of one or more obstacles that may be included in the global space organization function control configuration data 266. Local edit module 278 may enable, perform, or otherwise execute one or more processes (or portions thereof) that perform actions that at least enable local edits to the generated ornament.

The data layer may at least temporarily store, via the data layer module 260, data employed by the ornamentation layer to generate an ornament. Accordingly, as indicated by the communicatively coupling arrows, the data layer module 260 may provide the ornamentation layer module 270 at least portions of the data stored within the data layer. For instance, the data layer module 260 may at least temporarily store seed data 262, local edit data 264, the global space organization function configuration data 266, and element hierarchy data 268. Any data stored in data layer module 260 may be structured or unstructured data.

Seed data 262 may include any initial conditions supplied by the user, such as but not limited to the locations within the ornament area for the placement of initial decorative elements and the like. Local edit data 264 may include any data (or metadata) associated with or generated by the user's local edits of an ornament. As discussed throughout, the global space organization function software layer may generate one or more configurations to be employed for the generation of the ornament. Such configuration data may be stored in the global space organization function configuration data 266. For instance, global control space organization function configuration data 266 may include one or more control layer configuration files. Element hierarchy data 268 may include the decorative elements and the hierarchy that the decorative elements are arranged within. For instance, element hierarchy data 268 may include foreground elements, background elements, and any connection elements to be employed to connect the various placed elements.

A user may provide, edit, update, or otherwise modify at least portions of the data stored within the data layer. In at least one embodiment, UI 210 enables a user to provide, edit, update, or modify at least portions of the data stored within the data layer.

As discussed throughout, the global space organization function module 250 may provide the global control of the generation on an ornament via one or more control layers, such as placement functions, streamlines, user defined or paths, image data, or the like. Thus, a global space organization function may be employed by one or more placement policies, one or more connection policies, one or more collision policies, or one or more growth termination policies. Accordingly, the global space organization function module 250 may include one or more of placement functions 252, control layers 254, placement image data 256, or the like.

Placement module 272 may employ one or more of the user configurable placement policies that employ a global space organization function. Similarly, connection module 272, collision module, and local edit module 278 may employ one or more global space organization modules.

In at least one embodiment, a user may define, edit, and/or modify data that defines the various placement policies, such as a global space organization function via a global space organization function editor 212 included in UI 210. UI 210 may pass, or otherwise provide such data to the global space organization function module 250. The global space organization function module 250 may package and/or structure such data as a global space organization function data. The global space organization function module 250 may pass and/or provide the global space organization function data to the data layer module 260, to be stored as structured or unstructured global space organization function configuration data 266.

Similarly, via the element hierarchy editor 214 of UI 210, the user may provide, edit, and/or modify the decorative element hierarchies, to be stored as element hierarchy data 268 by the data layer of the procedural model engine 240. As discussed throughout, element hierarchies may include one or more hierarchies of foreground elements, background elements, connection elements, and the like. The user may additionally provide and edit image data via file browser and editor 216 of UI 210. For instance, the user may employ file browser and editor 216 to provide one or more image data files 218 to the procedural model engine 240. The one or more image data files 218 may include placement image data, connection image data, decorative element images, or virtually any other two-dimensional data that maps to pixels of an ornament. Accordingly, in some embodiments, UI 210 may be employed to provide, update, modify, or otherwise edit at least a portion of the data stored within data layer module 260.

UI 210 may include an ornament display and editor 220, which includes one or more displays of a generated ornament. For instance, as described below, ornament display and editor 220 is showing the generation of an ornament at four separate time slices. At view 222 (at time slice t=t0), a user has provided seed data for the generation of an ornament. For instance, at t=t0, the user may provide the placement of one or more seed elements (a flower and the seed location for the flower), as well as paths, boundaries, vector fields (shown by the arrows), or the like to be included in the various placement and connection policies. Such seed data, (for example, the placement of one or more initial (seed) elements) may be stored in the data layer module 260, as (structured or unstructured) seed data 262.

The data layer may pass or provide the seed data 262 and the global space organization function configuration data 266 to the ornamentation layer.

The ornamentation layer module 270, via at least one of the placement module 272, the connection module 274, or the collision module 276, may then generate an ornament. Such an initial ornament may be based on at least one of the seed data 262 or the global space organization function configuration data 266. Such an initially generated ornament is shown in view 224 (at the time slice t=t1>t0). As discussed throughout, UI 210 may enable the user to provide local edits to the generated ornament. In view 226 (at time slice t=t2>t1), the user is shown providing local edits to the generated ornament. Such local edits may be stored in the data layer as (structured or unstructured) local edit data 264. The data layer module 260 may pass the local edit data 264 to the ornamentation layer module 270. The ornamentation layer module 270, via local edit module 278, may update the ornament based on the local edit data 264 and the global space organization function configuration data 266. View 228 (at time slice t=t3>t2), shows the updated ornament that incorporates the user's local edits, provided in view 226. The user may store the ornament in non-transitory computer-readable storage media at any point during the interactive generation of the ornament.

Generalized Processes of a Procedural Model that Generates a Decorative Ornament Processes 300, 400 and 550 of FIGS. 3-5 will now be discussed in conjunction with at least system 200 of FIG. 2 and system 600 of FIG. 6. Briefly, processes 300, 400 and 550, either singly or in combination, may be employed to generate one or more decorative ornaments that are consistent with the various embodiments discussed herein. FIG. 6 depicts another system 600 implementing various embodiments of procedural models. System 600 includes an ornamentation generation engine 640 that is commutatively coupled to a user interface (UI) 610. Ornamentation generation engine 640 may include similar features to procedural module 240 of system 200. For instance, ornamentation engine may include one or more modules, such as but not limited to a global space organization function module, a data layer module, and an ornamentation layer module. Likewise, UI 610 may include similar features to UI 210 of system 200. In FIG. 6, UI 610 is displaying three various views of the generation or an ornament: view 622, 624, and view 628.

The various embodiments of procedural models, as described in at least conjunction with processes 300, 400, and 550 may be at least partially implemented by one or more engines. Thus processes 300-550 (or portions thereof) may be implemented by one or more engines, such as but not limited to procedural model engine 240 or ornament generation engine 640. More specifically, processes 300-550 (or portions thereof) may be implemented by one or more modules, such as but not limited to global space organization module 250, data layer module 260, and ornamentation layer module 270 of system 200.

Various embodiments of a procedural model may generate one or more decorative ornaments. For instance, processes 300-550, either singly or in combination, may generate decorative ornament 100 of FIG. 1A and/or decorative ornament 150 of FIG. 1B. The decorative ornaments may be generated in an area that includes a plurality of locations. For example, a 2D boundary may define or bound an area to generate the ornament within. In at least one embodiment, each location within the area may correspond to or map to one or more pixels within the ornament area.

The ornament generated within the area may include a plurality of decorative elements, such as but not limited to decorative elements 102, 112, 112, 132, 152, 154, 156, 158, 162, 172, 174, and the like of decorative ornaments 100 and 150. As discussed in conjunction with at least FIGS. 1A-1B, the decorative elements may be placed in a decorative element hierarchy, such a decorative element hierarchy may be provided by a user. For example, the element hierarchy may include one or more foreground elements, one or more background elements, one or more connection elements, and the like. The decorative element hierarchy may be provided by a user via one or more UIs and stored in element hierarchy data, such as element hierarchy data 268 stored in the data layer module 260.

In generating the ornament, processes 300-550 may place instances of the decorative elements in a subset of the plurality of locations within the ornament generation area. A particular location within the element (for instance, a geometric centroid of the element) may be placed at a pixel that corresponds to a location within the ornament area. At least because decorative elements are placed at a subset of the locations in the ornament area, the locations may be ornamentation locations. Because the decorative model is generated by one or more procedural models that are consistent with the various embodiments disclosed herein, the decorative ornament may be a procedural ornament.

As noted throughout, a global space organization function may take as input a position or location within the ornament area (the domain of the ornament) and generate one or more placement values for each position or location within the domain. The placement values are employed to determine the placement or elements within the ornament. Thus, the placement values may correspond to a placement preference, desirability, likelihood, probability, or the like. Accordingly, the ornament is organized by employing global information about the ornament area. Such global space organization functions may be configured via external input, such as but not limited to image data, curves drawn by the user, or a control layer including a vector field drawn by the user. As such, the global space organization function may be based on one of a design preference provided by the user.

A global space organization function may employ one or more placement functions. A placement function may determine a placement desirability at every point within the ornament area. Accordingly, the procedural model may employ a placement function to iteratively determine the position of the next elements where the function takes on its maximal value. The placement function may take virtually any input, such as but not limited to one or more positions of elements that have been previously placed in the ornament, the position of the most recently placed element, a boundary (such as an obstacle boundary), and the like. In some embodiments, the placement function may take as an input, one or more user drawn paths or obstacles, a control layer with one or more vector fields, guide paths determined algorithmically by path finding with or without an underlying vector field, or the like. In some embodiments, a placement function takes a position within the domain and generates a position desirability (or placement) value as output, wherein the placement of each element is iteratively based on the desirability values.

As discussed below, in some embodiments, the procedural model, may virtually (or actually) place and/or align an image over the ornament domain. One or more aspects of the image data may be employed to place the elements. For instance, the brightness or color of the information may be employed to place the elements during the generation of the ornament. In addition to the location of the placement of the elements, aspects of the placed elements may be based on the aligned image data. Such aspects of the elements may include, but are not limited to an element orientation, element color, a distance from other previously placed elements, and the like. In some embodiments, the one or more guide paths determined by a global space organization functions may be based on obstacles, goal points (or anchors), and/or vector fields supplied by a user.

Figure 3:
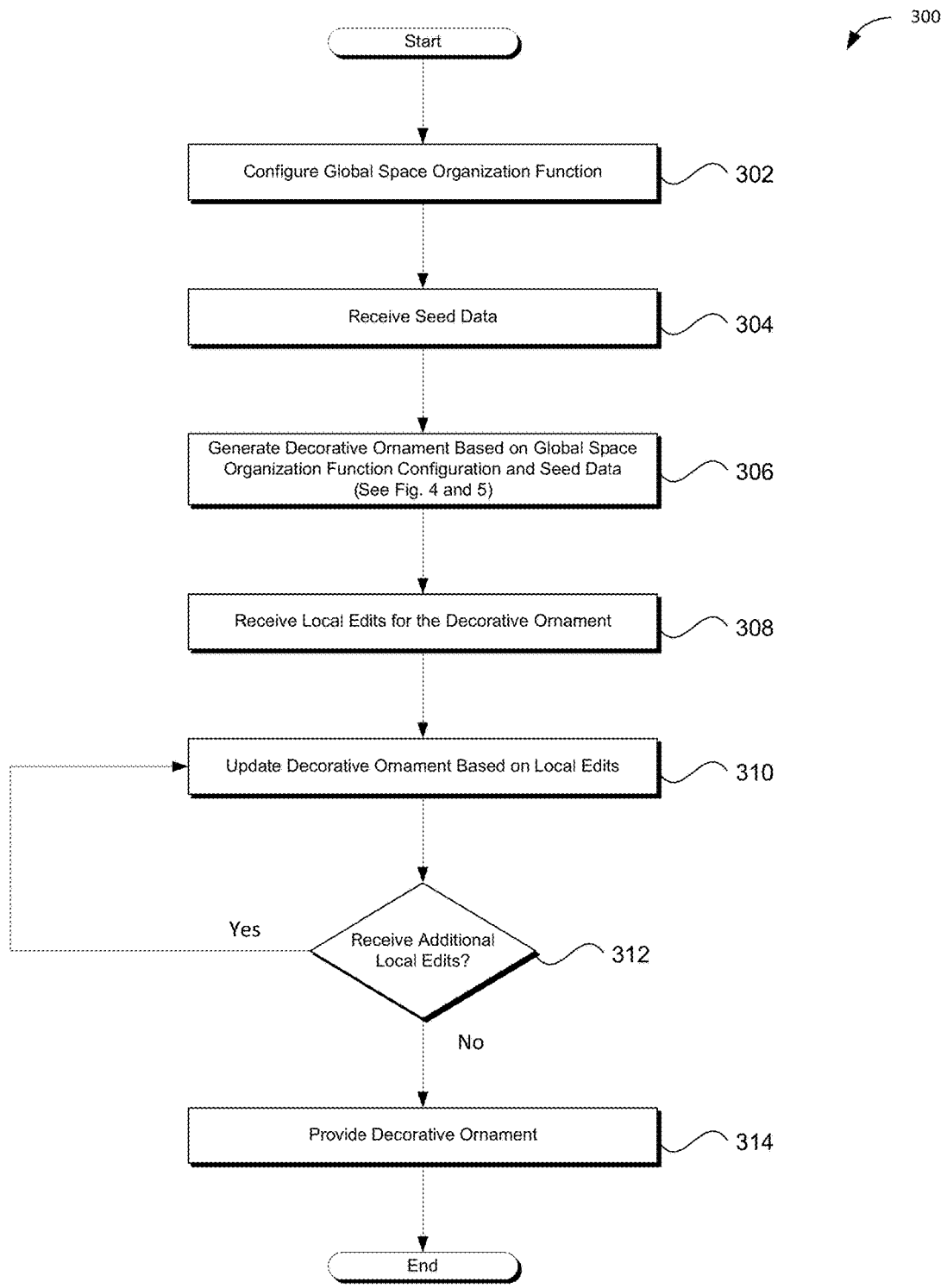
FIG. 3 illustrates one embodiment of a process flow for a procedural model that is consistent with the various embodiments presented herein.

FIG. 3 illustrates one embodiment of a process flow 300 for a generalized procedural model that is consistent with the various embodiments presented herein. Process 300 begins, after a start block, at block 302 where the global space organization function is configured and/or determined. As discussed throughout, based on the configured global space organization function, various embodiments of the procedural model may automatically generate one or more ornaments that conform to the user's desired aesthetic.

Additionally and/or alternatively, a global space organization function may employ one or more factors based on a distance from one or more elements already placed in the ornament or a distance to a boundary or obstacle included in the ornament. Global space organization functions enable the user to control the placement of elements in the ornament, when one or more indeterminacies and/or degenerate placement conditions occur. As discussed below, placement image data may be employed as an input to a global space organization function to determine the placement of at least a portion of the elements included in an ornament.

Global space organizations functions may include one or more placement functions and/or connection functions. Global space organization functions may determine one or more connection paths or streamlines to constrain the placement of and/or connections between elements included in an ornament, via placement or connection functions. Similar to the placement functions, the connection functions may be employed by or included in one or more functions that further control the placement or connections between elements. As discussed throughout, various embodiments of placement or connection functions may include one or more anchor points, masks, stencils, or other such obstacles that further control the connections between the elements. Connection image data may be employed to constrain the connections between the elements.

When placement and/or the connection functions would otherwise result in the placement of a decorative element within or otherwise colliding with an obstacle, such as but not limited to a mask or stencil placed within the ornament area, the global space organization function may resolve such scenarios. For instance, the global space organization function may provide an alternative placement of such decorative elements to avoid the collision. Accordingly, a global space organization function may enable one or more shortest path processes to determine an alternative placement or path for the decorative element. The one or more shortest path processes may be employed such that the placement of and/or connections between one or more decorative elements avoid collisions with one or more obstacles included in the connection policies. The shortest path processes may employ one or more movement cost functions to determine the shortest path to avoid an obstacle.

In at least one embodiment, a shortest path process may be a modified shortest path process that employs a modified movement cost function. A modified shortest path processes generates a modified path around one or more obstacles. Although the modified path may not be an optimized shortest path, the modified path around one or more obstacles may be more decorative and/or visually appealing than an optimized shortest path. Accordingly, such modified movement cost functions may generate an ornament that includes an aesthetic that is more consistent with the user's intentional design.

At block 302, a user may employ one or more UIs, such as but not limited to UI 210 of system 200 or UI 610 of system 600 to provide one or more global space organization functions. View 624 of UI 610 shows a user configuring a global space organization function by employing UI 610 to provide a curve or path, within ornament area 606, to be included in the global space organization function. As discussed herein, the decorative ornament will be generated within area 606. The path provided by the user may be a connection path to include in and/or update the global space organization function. In at least one non-limiting embodiment, a user may provide one or more files that include placement image data. Image data, such as but not limited to placement image data or connection image data, may be employed in the generation of a decorative ornament. In various embodiments, the user may be enabled to provide, or at least define, area 606 when providing at least portions of the configuration of the global space organization function.

In at least one embodiment, a user may employ one or more modules, such as but not limited to global space organization function module 250 of system 200, to configure the global space organization function, the configuration of which may be referred to as the global control layer configuration. The global space organization function module may provide the global space organization function configuration to a data layer module, such as but not limited to data layer module 260 of system 200. For instance, data layer module 200 may store the global space organization function configuration as global space organization function configuration data 266.

At block 304, seed data may be received. Through one or more UIs, the user may provide the placement of one or more "initial" or seed elements, as seed data. In some embodiments, the ornament "grows" or "evolves," from the placement of one or more seed elements at one or more seed locations (within the ornament area) based on the global control layer configuration. Such seed data may further include at least one of one or more paths, vector fields, obstacles, anchor points, placement image data, connection image data, and the like, which further constrains and/or controls the growth or evolution of the ornament. The growth or evolution of the ornament may be based on the global space organization function. For instance, as noted above, view 624 of UI 610 demonstrates that the user may provide curves and/or vector fields that are used to update or configure the global space organization function. As such, a UI may enable a translation of visual input (from the user) into a global space organization function configuration. Thus, the configured global space organization functions, discussed in at least the context of at least block 302 may be employed by the procedural model to generate the ornament. In at least one embodiment, the configuration of the global space organization function may be based on placement and/or connection image data. In some embodiments, one or more seed locations may be determined based on the image data. The seed locations or seed data may be employed to updated the global space organization function.

For instance, a user may provide seed data to seed the generation of a decorative ornament. View 622 of UI 610 shows a user employing UI 610 to provide a seed location, included in the plurality of locations of area 606, for the placement on an initial or seed decorative element included in the decorative ornament. Similarly, view 222 of system 200 shows a user providing seed data for the generation of an ornament. The seed data of view 222 includes a seed location, arrows to at least partially indicate a vector field, and a boundary. Accordingly, the user may provide an indication of one or more seed locations. As shown in view 222, in response to receiving the indication of the seed location, an instance of a decorative element may be placed at the seed location. In various embodiments, the user may provide additional seed data, such as the location of additional seed elements, obstacles such as stencils or masks, anchor points, or the like.

Seed data received at block 304 may be stored in a data layer module. For instance, seed data 262 is stored by data layer module 260. Such seed data may be incorporated into various aspects of the global control configuration. The seed data may be employed to generate and/or update placement functions, connection vector paths, or the like. Thus, the global space organization function configuration data 266 may be updated in view of the received seed data. For instance, in response to receiving a seed location from the user, one or more placement functions may be generated and/or updated based on the seed location and one or more geometric and/or isometric transformations.

At block 306, one or more decorative ornaments are generated based on the global space organization function configuration and the seed data. Various embodiments of generating a decorative ornament, such as but not limited to ornaments 100 and 150 of FIGS. 1A-1B respectively, are discussed in conjunction with at least process 400 of FIG. 4 and process 550 of FIG. 5. However, briefly at block 306, a subset of the plurality of locations within the ornament generation area may be iteratively determined based on at least the configured global space organization function.

For the generated ornament, a decorative ornament may be placed at each of the subset of the determined locations. Accordingly, the subset of locations may include the one or more seed locations received at block 304. The ornament may be generated interactively. For instance, view 626 of UI 610 shows at least a partially generated ornament, wherein the subset of locations that include a placed element includes the seed location, as well as two other locations that are populated by instances of decorative elements.

The subset of locations may further be based on the one or more growth termination policies of the global control layer configuration included in the global space organization function. For instance, the growth termination policies may provide one or more rules, conditions, determinations, heuristics, or the like as to when to terminate the iterative determination of the subset of locations. As discussed throughout, some embodiments may employ one or more stochastic processes in generating an ornament. Thus, at least a portion of the subset of the locations may be based on one or more stochastic determinations. Such determinations may be made based on one or more calls to a random or pseudo-random generator.

In at least some embodiments, the subset of the plurality of locations determined at block 306 may be a ranked subset. For instance, the subset may be ranked via the order of the iterative determinations. In an exemplary, but non-limiting embodiment, a seed location may be the highest ranked within the subset. The next location determined after the seed location may be the second ranked location, and so forth. Generating the ornament at block 306 may include placing a decorative element at each of (or at least a portion of), the subset of the plurality of locations.

In at least one embodiment, determining a subsequent location to place a subsequent element at may be based on a comparison of an evaluation of the global space organization function at the subsequent location and an evaluation of the global space organization function at the current location. In such embodiments, the current location may be ranked higher than any subsequently determined locations.

In at least one embodiment, higher-ranking decorative elements in the element hierarchy are placed at the higher-ranking positions of the ranked subset of locations. Similarly, lower-ranking decorative elements in the element hierarchy may be placed at the lower-ranking positions of the ranked subset of locations.

At block 308, one or more local edits may be received for the decorative ornament. The user may provide local edits for the generated ornament, via the one or more UIs. Such local edits may include at least one of an insertion or deletion of an element into/from the ornament. In at least one embodiment, a local edit may include modifying and/or updating the position and/or a connection of one or more elements to another element included in the ornament.

For instance, the generated decorative ornament may be provided to a user, via the UI displayed on the user's display device. View 224 of UI 210 of system 200 shows an ornament provided to the user. The user may employ the UI to edit or delete one or more of the decorative elements included in the decorative ornament. A user may add additional decorative elements to the ornament. In at least one embodiment, a user may update or modify the location that a decorative element is placed at. View 226 shows the user employing UI 210 to provide local edits for the ornament.

At block 310, the decorative element is updated based on the one or more local edits received at block 308. In various embodiments, process 300 ensures that the structure of the ornament is consistent with both the user provided local edits and the global control layer configuration. For instance, upon receiving local edits from the user, at least one embodiment of a procedural model may further update and/or modify the ornament such that the updated and/or modified ornament is constrained by the global space organization function, while including the local edits. Thus, in response to receiving local edits, at least a portion of the subset of the plurality of locations that include a placed decorative element may be updated based on the local edits and/or the global space organization function. For instance, the subset of the locations may be updated based on one or more placement functions included in or employed by the global space organization function.

In at least one embodiment, the global space organization function may include or employ a connection soundness function to update the subset of the plurality of locations. The connection soundness function may guide the user interaction when the user moves or deletes elements existing in the ornament. For instance, when the user moves or deletes an existing element, a connection soundness function may determine one or more values corresponding to the desirability of each of a plurality of possible ways to reconnect the elements. The procedural model may choose the way of reconnecting the elements that maximizes the connection soundness function.

The user may iteratively provide additional local edits, discussed in conjunction with at least decision block 312, to the updated and/or modified ornament. Accordingly, the user may interactively provide design feedback to provide even greater control of the overall aesthetic of the ornament.

For instance, in response to the user providing the local edits, the ornament may be updated such that the affected portion of the decorative elements are re-positioned. Accordingly, the subset of the plurality of locations that include placed decorative elements may be updated or modified at block 310.

At decision block 312, it is determined whether additional local edits are received. If additional local edits are received at block 312, process 300 may return to block 310 to provide the interactive feedback to apply the additional updates to the decorative ornament based on the additional local edits. If additional local edits are not received at decision block 312, process 300 may flow to block 314.

At block 314, the decorative ornament is provided to one or more users. In one non-limiting embodiment, the decorative ornament is outputted to a display device, such as a printer, monitor, or the like. A display device may include an ornament display and editor, such as ornament display and editor 220 of UI 210 of FIG. 2. View 228 of UI 210 shows the updated (based on the local edits or feedback) ornament to a user. Process 300 may terminate and/or return a calling process.

Figure 4:
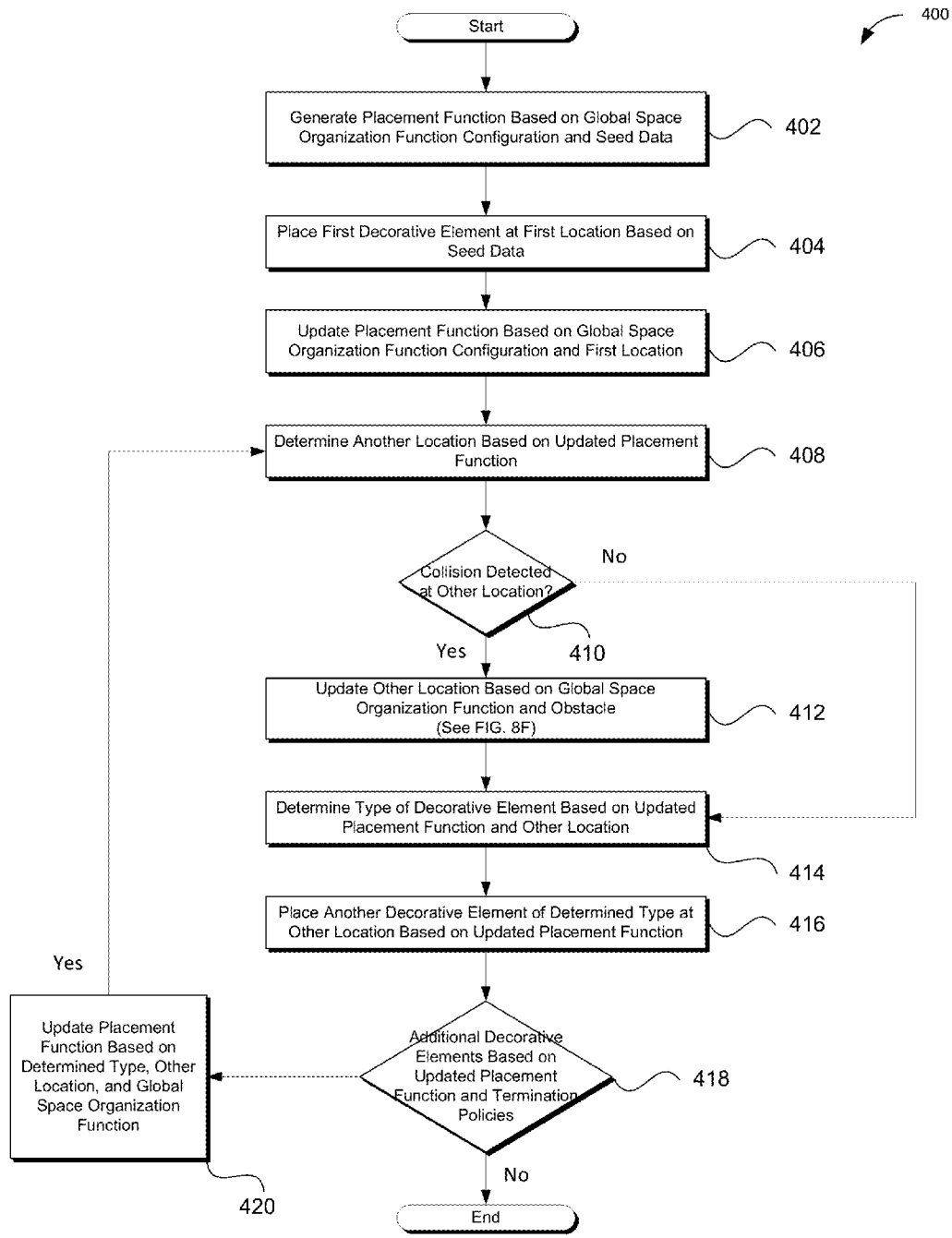
FIG. 4 illustrates one embodiment of a process flow for generating a decorative ornament that is consistent with the various embodiments presented herein.

FIG. 4 illustrates one embodiment of a process 400 flow for generating a decorative ornament that is consistent with the various embodiments presented herein. Process 400 (or portions thereof) may be called by any of the various embodiments of procedural models discussed herein. For instance, process 300 of FIG. 3 may call process 400 (or portions thereof). In at least one embodiment, block 306 of process 300 calls process 400. Various aspects of process 400 may be described in conjunction with FIG. 7.

After a start block, process 400 begins at block 402, where one or more placement functions are generated. At block 402, a placement function may be generated based in the global space configuration function configured and/or generated at block 302 of FIG. 3. In at least one embodiment, the placement function may be equivalent to, or at least similar to the global space organization function.

A placement function may be defined within the ornament area. As defined over the area, the placement function may map each location and/or pixel within the ornament area to one or more values that include at least a real number. In some embodiments, the placement function may be a scalar function. In other embodiments as discussed in conjunction with at least process 550 of FIG. 5, the placement function may include one or more vector fields defined over the area. For a scalar placement function, the one or more values of the placement function are higher at corresponding locations within the area where a placement of a decorative element is preferred or more probable, as compared to a location where the placement is not as preferable. As discussed below, the one or more placement functions may be based on at least the global space configuration function configuration and/or the received seed data.

In at least one embodiment, the values of the placement function may be normalized such that an integration of the of placement function over the ornament area is normalized to 1.0. Thus, a placement function may be a probability density function, where the value of the function evaluated at a location in the area corresponds to a probability, likelihood, or preference of placing a next decorative element at the location, while iteratively placing elements with the ornament area. In at least one embodiment, a scalar placement function may be scaled to range between 0.0 and 1.0.

As discussed below in conjunction with at least FIG. 7, in various embodiments, the global control layer configuration may include placement image data as placement data to guide the generation of an ornament. In such embodiments, the one or more placement functions may be generated based on the placement image data. Thus, at block 402, a correspondence between the placement image data and the locations included in the ornament area may be generated. In some embodiments, an affine transformation is employed to generate the correspondence. The one or more placement functions may be generated based on the correspondence between the placement image data and the locations.

For instance, a placement function may be generated by at least intensity volumes in a chroma and/or lumina channel in the channel. The placement function at a particular location in the ornament area may be based on a brightness of one or more corresponding pixels in the image data. In at least one embodiment, the placement function may be a scalar function generated based on the grayscale values of the image data at the corresponding location. Thus, the placement function may be based on the pixel values included on the image data. In other embodiments, the generated placement function may include a vector field function that maps a location in the ornament area to a vector value.

At block 404, a first decorative element is placed at a first location of the plurality of locations within the ornament area. The first location may be based on seed data, such as but not limited to the seed data received at block 304 of process 300. For instance, a seed decorative element may be placed at a seed location, such as the placement of the seed element at the seed location in view 222 of UI 210 of FIG. 2 or view 622 of UI 610 of FIG. 6.

At block 406, the one or more placement functions may be updated based on the placement policies in the global space organization function configuration and the first location. In at least one embodiment, the global space organization function is updated at block 406. As noted throughout, the global space organization function may include and/or generate a placement value for each of the locations. The placement value at each location corresponds to a placement preference, desirability, likelihood, or probability at the location. When the placement function and/or global space organization function is updated, each of the placement values may be updated.

Views 672 and 676 within ornamentation engine 640 of FIG. 6 show updated placement functions and/or global space organization functions based on the first or seed location. The scalar placement functions over the ornamentation area are shown in grayscale, where the higher values of the placement functions are shown with darker tones (lower grayscale values). In view 672, the updated placement function at each particular location is based on a distance determination between the particular location and the first location. In view 676, the placement function is based on a stencil included in the placement policies.

Figure 8A:
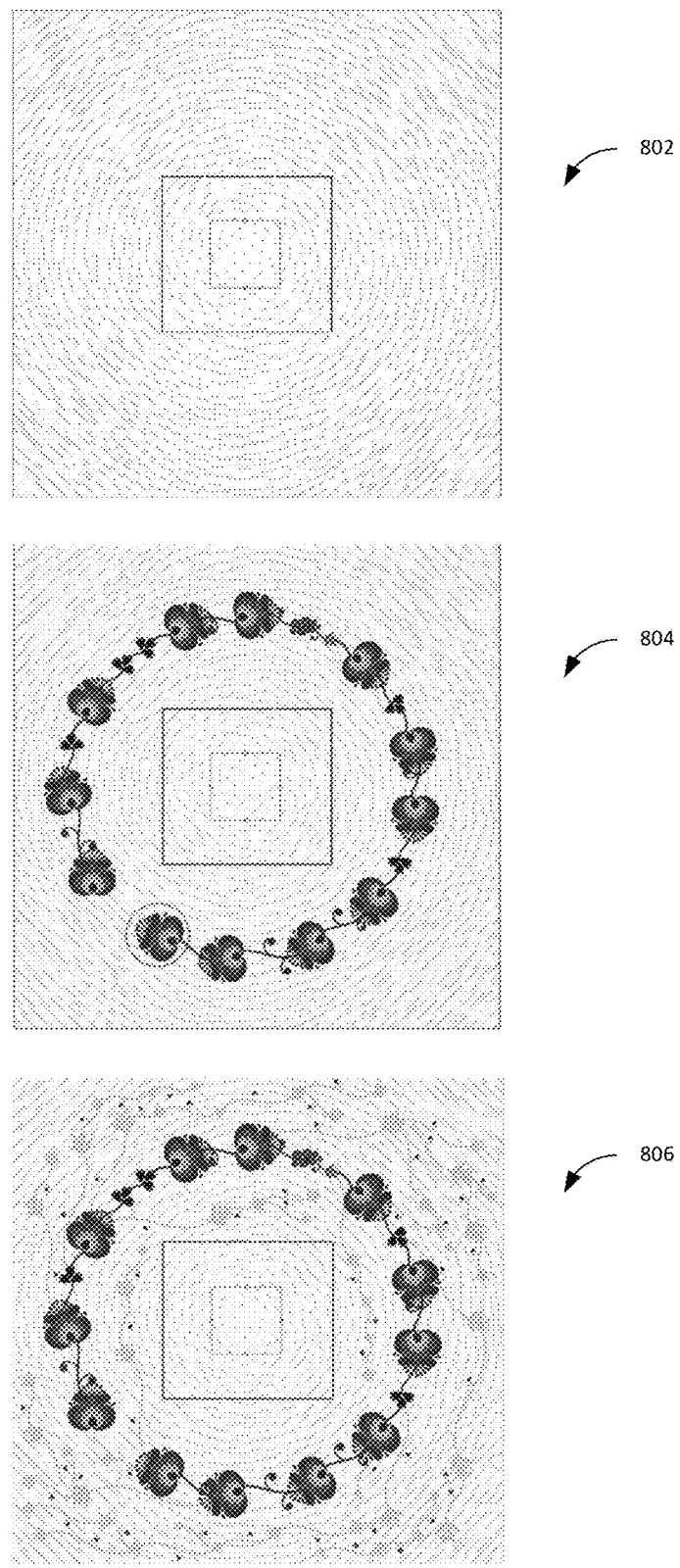
FIG. 8A shows various views of generating a decorative ornament by employing a procedural model that iteratively places foreground and background decorative elements along streamlines based on vector fields and cost functions, as described in conjunction of FIG. 5.
Figure 8B:
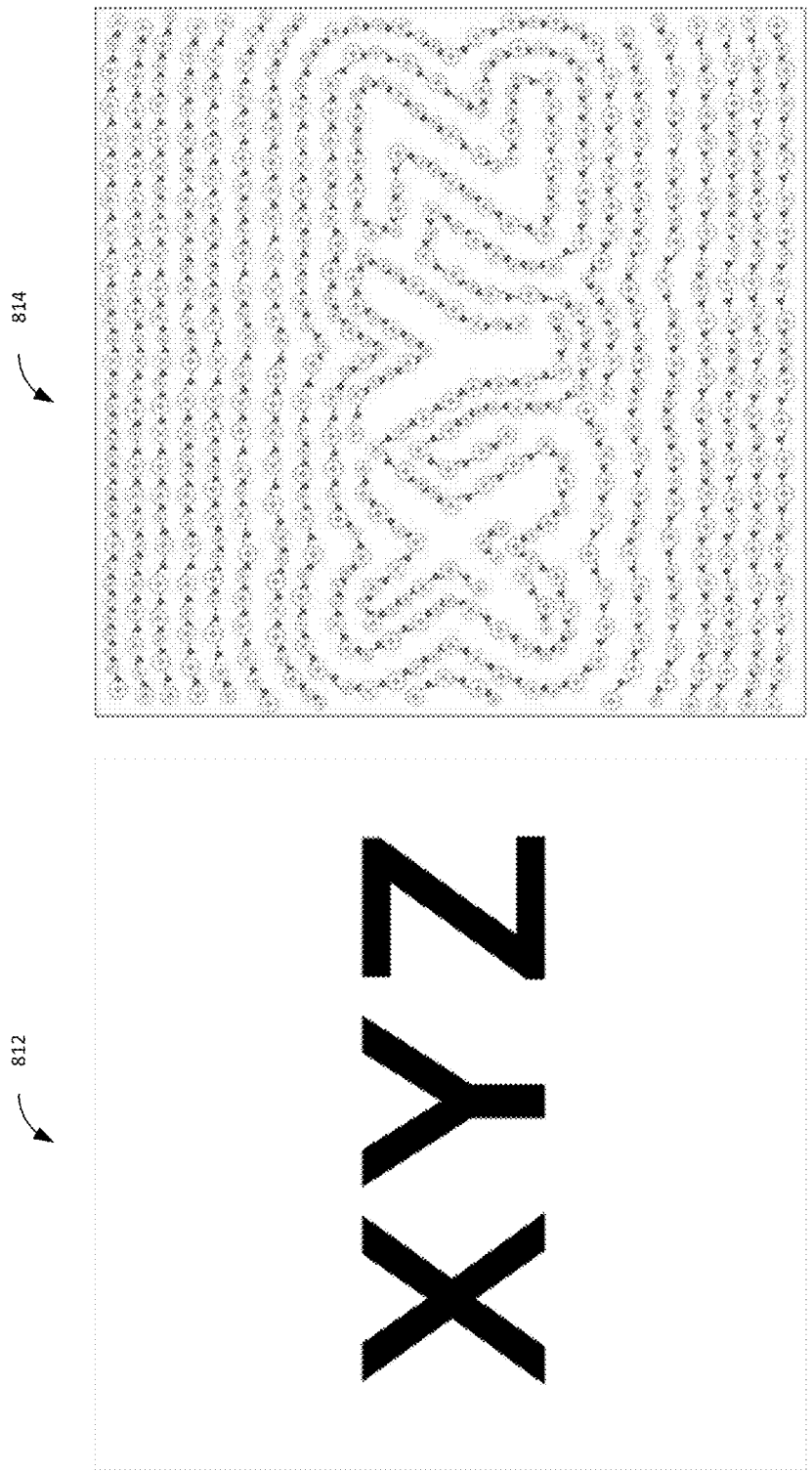
FIG. 8B shows various views of generating another decorative ornament by employing a procedural model that iteratively places decorative elements along streamlines based on vector fields and cost functions, as described in conjunction of FIG. 5.
Figure 8C:
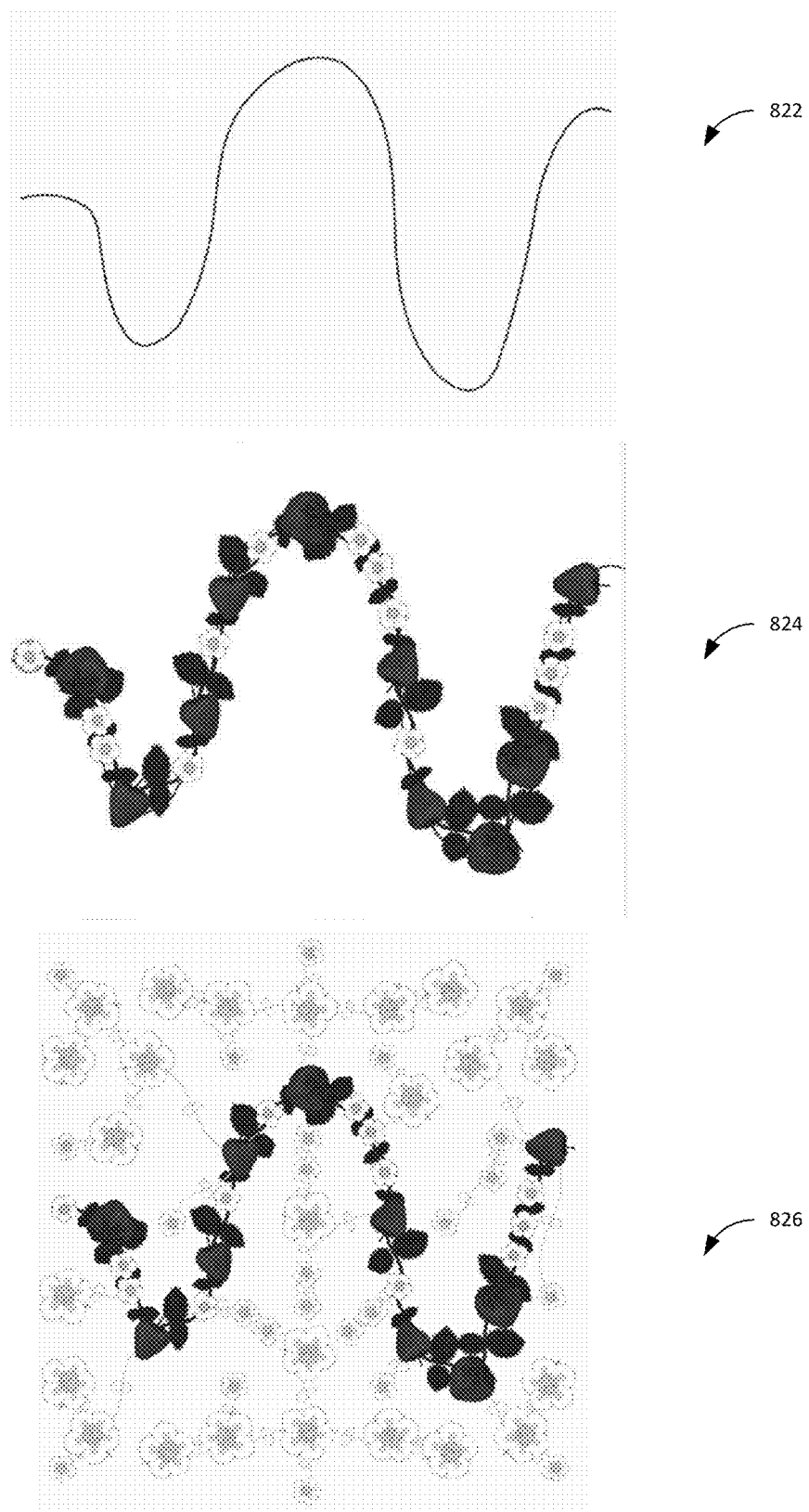
FIG. 8C shows various views of generating another decorative ornament by employing a procedural model that iteratively places foreground and background decorative elements along streamlines based on user provided paths and cost functions, as described in conjunction of FIG. 5.
Figure 8D:
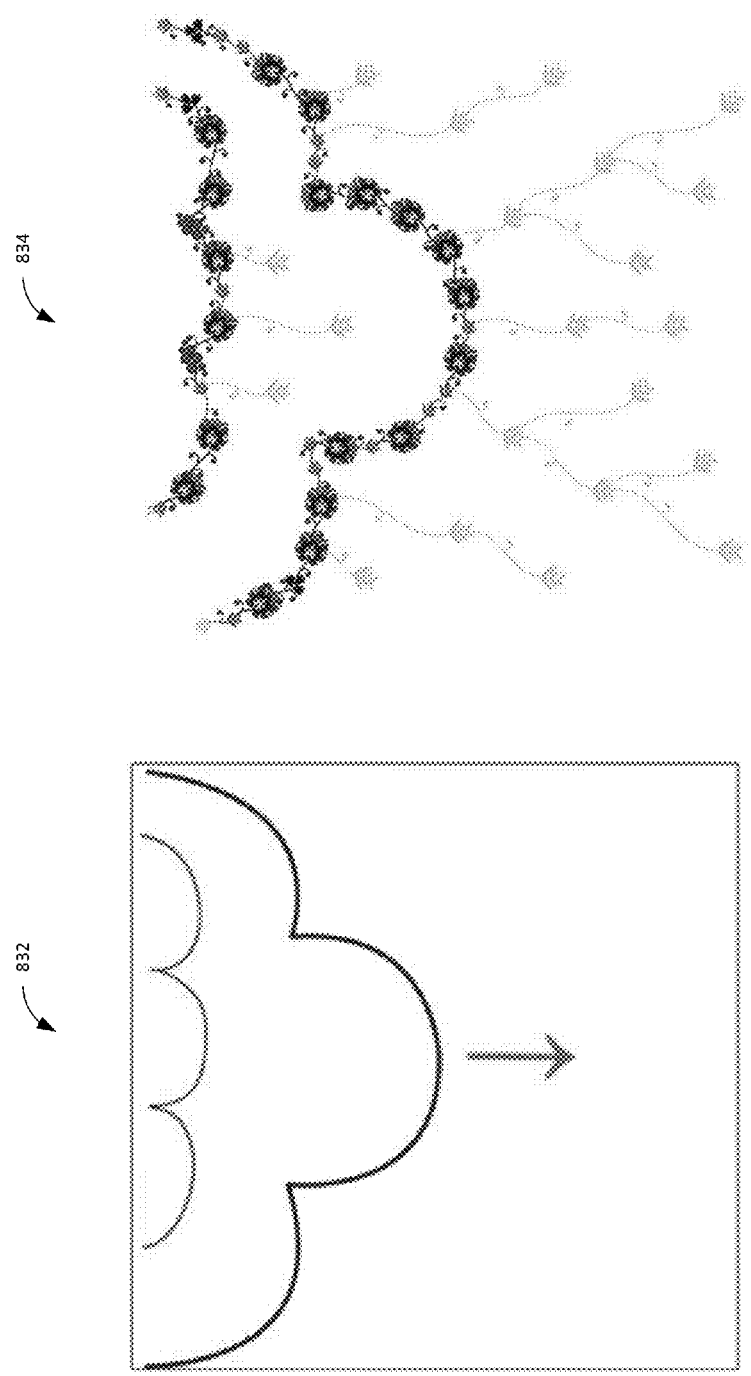
FIG. 8D shows various views of generating yet another decorative ornament by employing a procedural model that iteratively places foreground and background decorative elements along streamlines based on user provided paths and cost functions, as described in conjunction of FIG. 5.
Figure 8E:
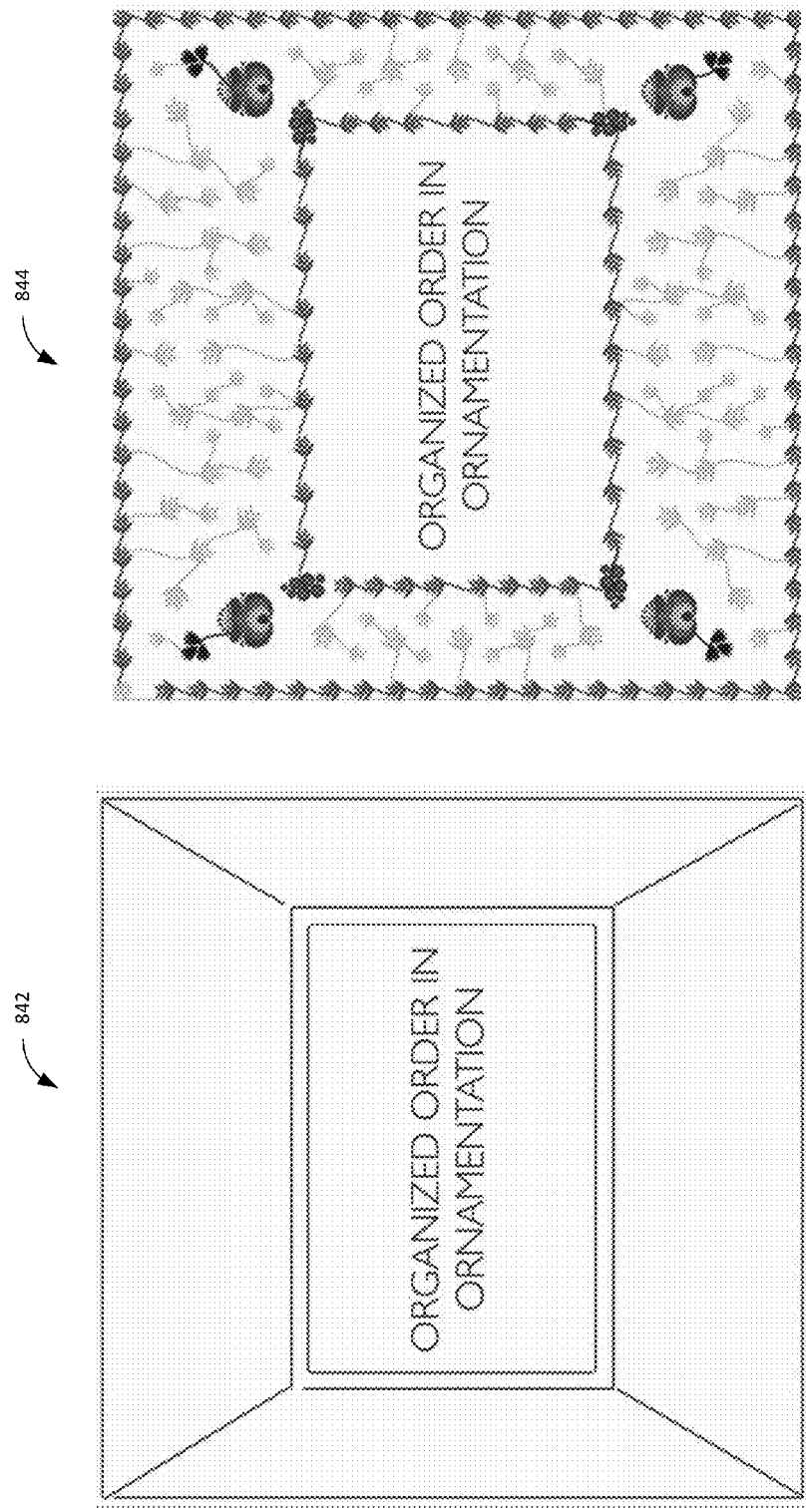
FIG. 8E shows various views of generating still yet another decorative ornament by employing a procedural model that iteratively places foreground and background decorative elements along streamlines based on user provided paths and cost functions, as described in conjunction of FIG. 5.

As discussed in further detail in conjunction with at least FIG. 8C-8E, view 678 of FIG. 6 shows a family of connection or placement curves generated by seed data that includes at least a seed curve. Thus, a placement function may be generated based on one or more seed curves. View 624 of FIG. 6 shows a user providing such a seed curve. View 680 shows a generated placement function based on the seed curve. In at least one embodiment, the placement function is valued 0.0 at all locations, except for locations included on the seed curve.

As such, one or more placement functions may be generated and/or updated based on the one or more curves. The values of the placement function are higher for locations along the curve than for locations that do not lie along the curve, such that decorative elements are placed at locations lying on the curve. Thus, in response to receiving the curve, a placement function may be generated and/or updated. An evaluation of the placement function at locations on the curve may be greater than an evaluation of the placement function at locations not one the curve (a complement of the subset of the plurality of ornamentation locations that lie on the curve). The placement function may apply geometric transformation that includes one or more displacements along the curve.

At block 408, another (or a second location) is determined based on the updated placement function. For instance, in at least one embodiment, the location that corresponds to the maximal value of the updated placement function is determined at block 408. Accordingly, to determine the maximal value, determining the second location at block 408 may be based on the updated placement function evaluated at each of the locations not currently populated by a decorative element. Thus, the second location may be the location that maximizes the evaluation of the placement function, across the available locations within the ornament area.

In some embodiments, one or more placement heuristics may be employed to update the placement function and/or determine the next placement location.

It should be understood that by configuring the global organization space function, any arbitrary-design for the generation of an ornament is enabled by at least defining the placement policies, one or more placement functions, or one or more placement heuristics. Because the one or more placement functions and the one or more placement heuristics may take any user-defined form, a user may interactively guide the generation of an ornament to include virtually any desired features, structures, design, or the like.

Figure 8F:
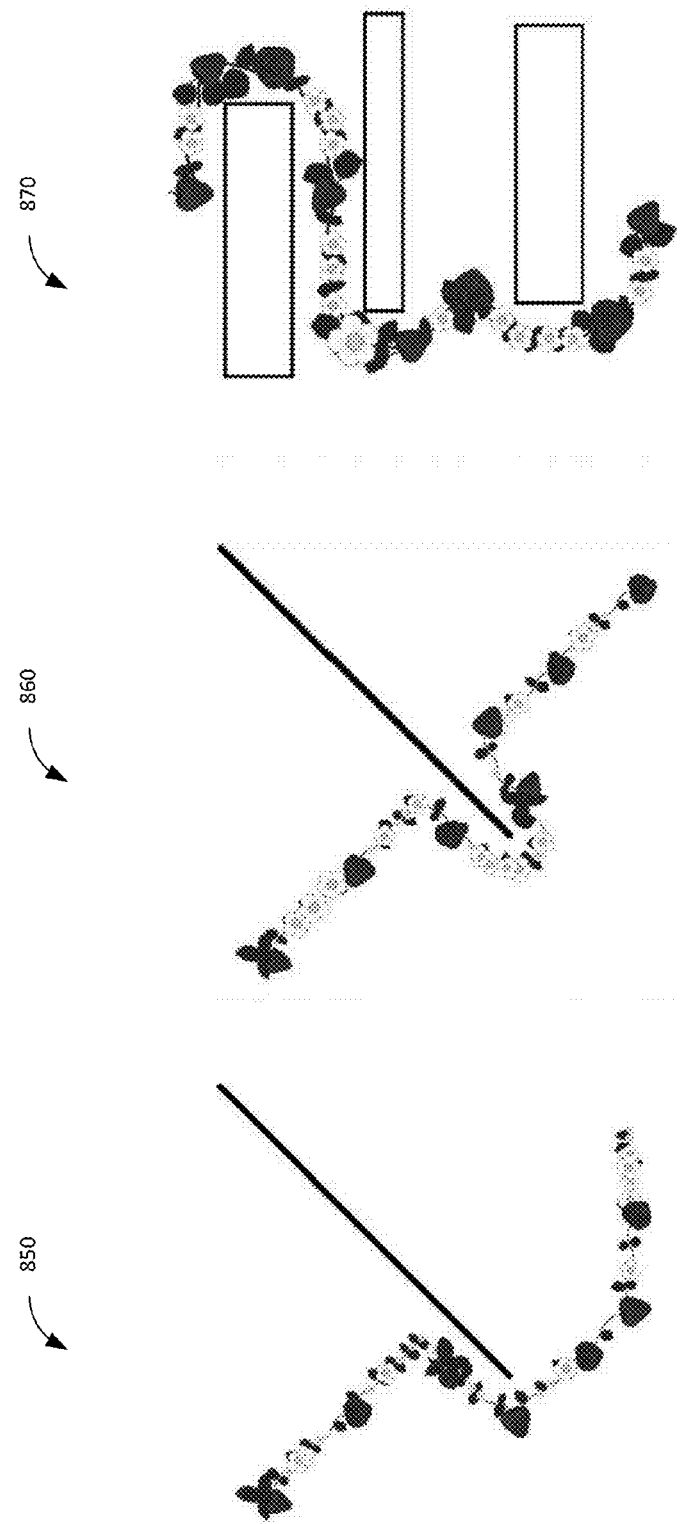
FIG. 8F shows various embodiments of updating a placement location when a potential collision with an obstacle within the ornament area is detected.

At decision block 410, it is determined whether a collision is detected at the second location with one or more obstacles. For instance, a user may define one or more obstacles such as a stencil or a mask in the global control layer configuration. View 850 of FIG. 8F shows one such detected collision event. If a collision is detected at decision block 410, process 400 flows to block 412. Otherwise, process 400 flows to block 414.

At block 412, the other (or second) location may be updated based on one or more collision policies and the obstacle. Various embodiments of updating the other location are discussed below in conjunction with at least FIG. 8F. Briefly here, FIG. 8F shows various embodiments of updating a placement location when a potential collision with an obstacle within the ornament area is detected.

At block 414, a type of decorative element to be placed at the other (or second) location is determined. The type of the decorative element may be a foreground element, back element, connection element, or any other element type included in the element hierarchy. The type may be determined based on the updated placement function and the second location. For instance, at block 414, it may be determined whether to place a foreground object or a background object based on the distances from the other location to the placement locations of decorative elements previously placed.

At block 416, another (or a second) decorative element may be placed at the second location. The placed decorative element may be of the type determined at block 414.

At decision block 418, it is determined where to place additional elements in the decorative ornament. Determining whether to place additional elements may be based on the updated one or more placement policies and any termination policies included in the global control layer configuration. For instance, a termination policy may require the iterative placement of decorative elements to be terminated when one or more placement functions are less than a placement threshold included in the termination policies. If no additional elements are to be placed, process 400 may terminate and/or return a calling process. Otherwise, process 400 may flow to block 420.

At block 420, the placement function is updated based on the determined type, the second location, and the global space organization function. In at least one embodiment, the global space organization function is updated at block 420. When the placement function and/or global space organization function is updated, each of the placement values may be updated.

The one or more placement functions and/or global space organization functions may be updated based on any previous placements of decorative elements within the ornament and as discussed in the context of at least block 406. Process 400 flows back to block 408 to iteratively determine additional locations to place additional decorative elements in an ornament. In some embodiments, foreground decorative elements may be placed during the first N iterations of process 400, and the background decorative elements are placed during the final M iterations, where there are a total of N+M iterations of the loop shown in FIG. 4.

Figure 7:
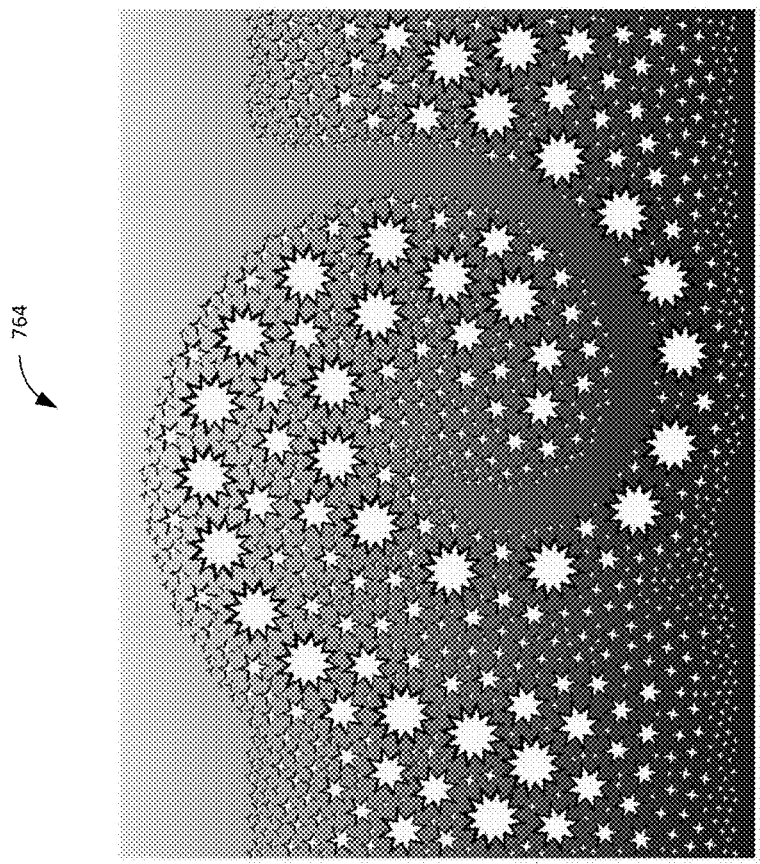
FIG. 7 depicts a decorative ornament generated by a procedural model that is consistent with the various embodiments discussed herein and employs placement image data in the placement policies of the global layer control configuration.
Figure 7:
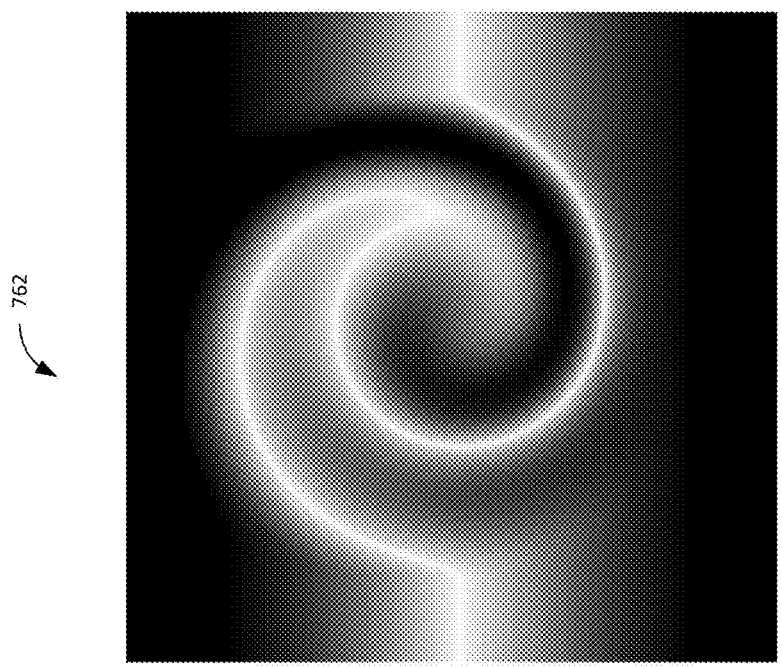

FIG. 7 shows a decorative ornament 764 generated by a procedural model that is consistent with the various embodiments discussed herein and employs placement image data 762 in the placement policies of the global layer control configuration. Thus, placement image data 762 may be an embodiment of placement data. A user may employ one or more UIs to provide image data 762. To generate one or more placement functions to generate ornament 764, the procedural model may generate a correspondence between image data 762 and the locations included in the ornament area.

For instance, a placement function may be generated by at least intensity values in a chroma and/or lumina channel in the channel. In at least one embodiment, the placement function may be generated based on the grayscale values of the image data at the corresponding location. Thus, the placement function may be based on the pixel values included on the image data.

The procedural model may place larger decorative elements at corresponding locations that include higher intensity values of the image data. Once all the highest intensity locations have been populated with larger decorative elements, smaller elements may be placed at locations of corresponding lesser intensity values to generate ornament 764. The relative sizes of the various placed decorative elements may be based on the transformation employed to generate the correspondence between the image data and the locations included in the ornament area. For instance, the size of a decorative element to be placed may be scaled based on the affine transformation and the relative value of the pixel value in the image data. In at least one embodiment, a termination policy may be employed to terminate iteratively placing decorative elements at locations when the next elements to be placed is scaled, such that the element is smaller than a threshold size value included in the global control layer configuration.

Figure 5:
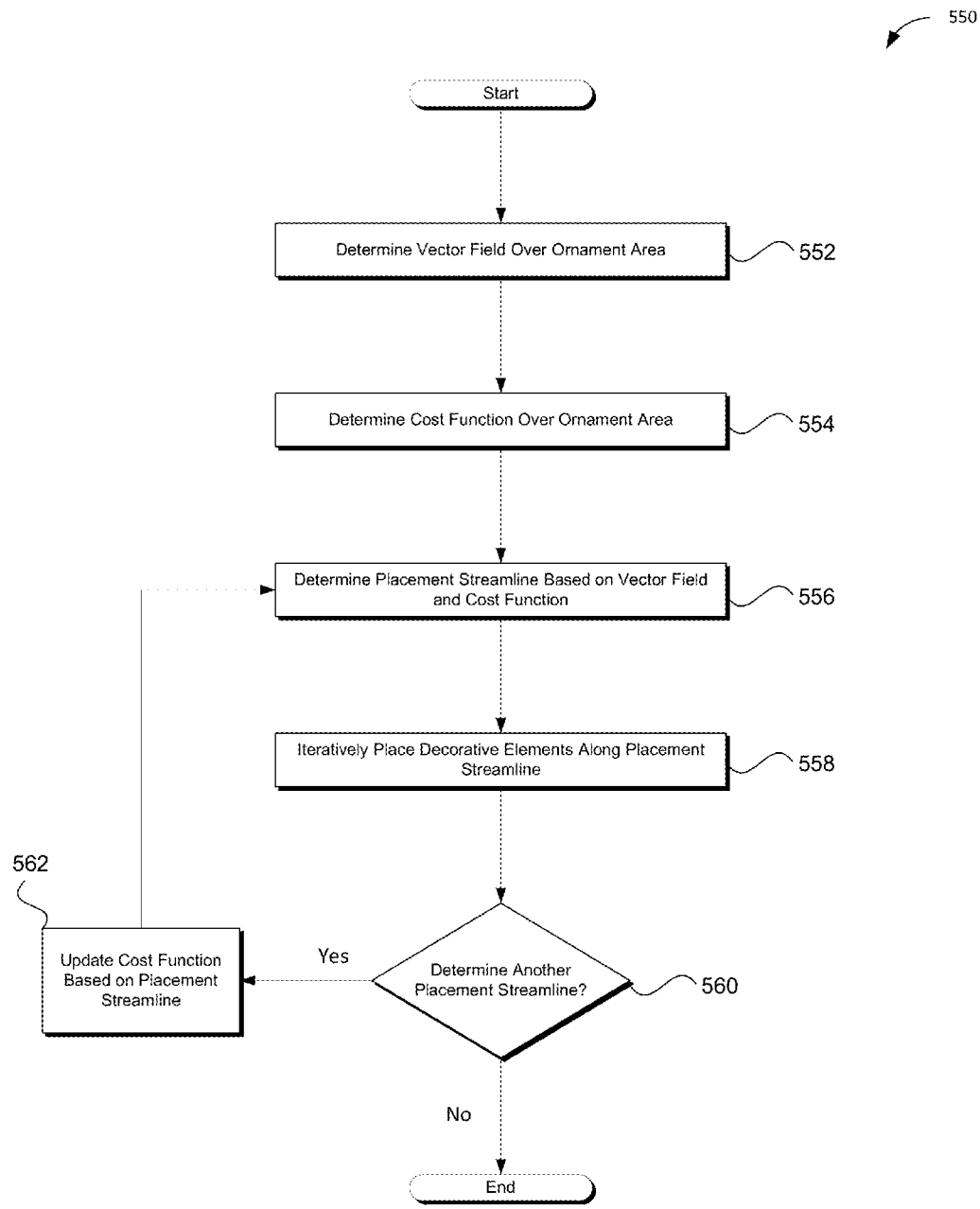
FIG. 5 illustrates another embodiment of a process flow for generating a decorative ornament that is consistent with the various embodiments presented herein.
Figure 6:
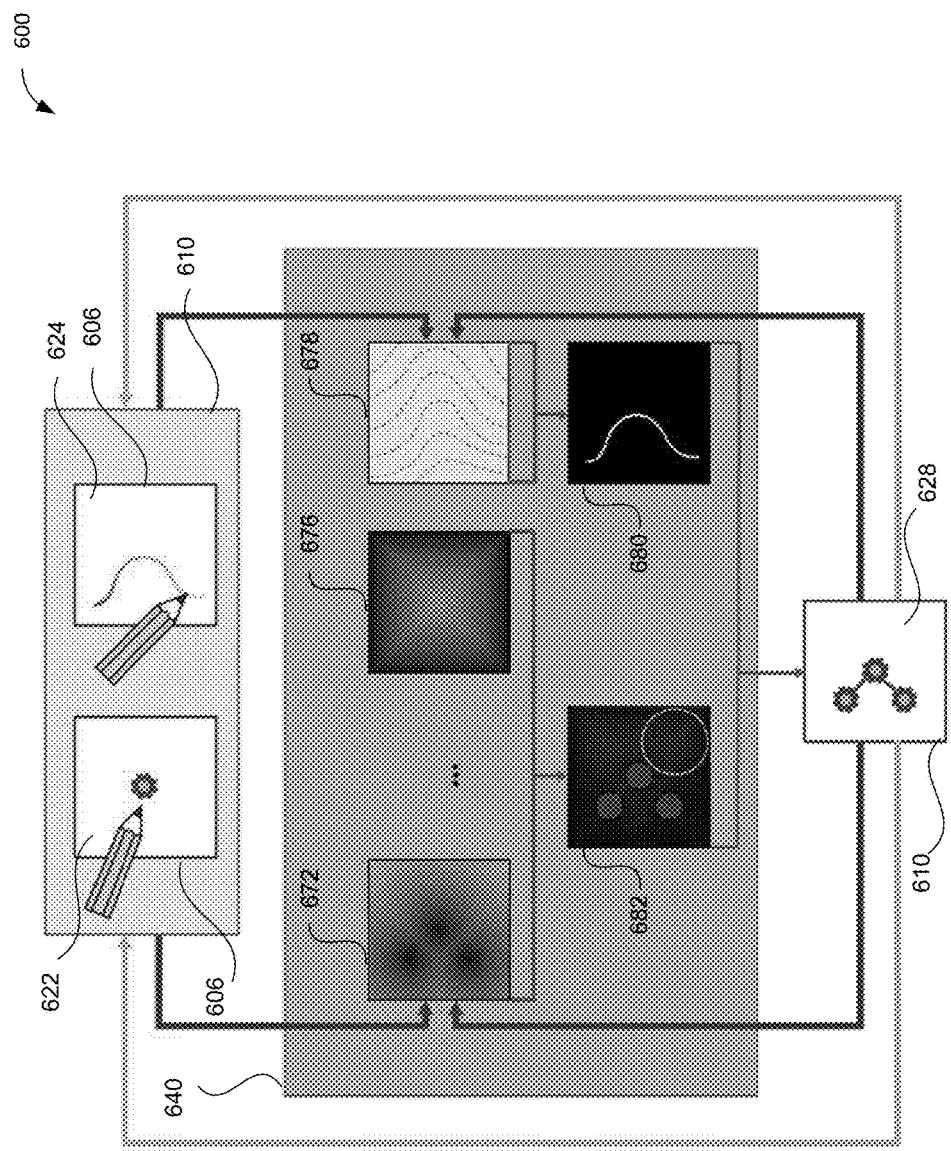
FIG. 6 depicts another system implementing various embodiments of procedural models that are consistent with the various embodiments presented herein.

FIG. 5 illustrates another embodiment of a process 550 flow for generating a decorative ornament that is consistent with the various embodiments presented herein. Process 550 (or portions thereof) may be called by any of the various embodiments of procedural models discussed herein. For instance, process 300 of FIG. 3 may call process 550 (or portions thereof). In at least one embodiment, block 306 of process 300 calls process 550. Various aspects of process 500 may be described in conjunction with FIGS. 8A-8F.

FIG. 8A shows various views of generating a decorative ornament by employing a procedural model that iteratively places foreground and background decorative elements along streamlines based on vector fields and cost functions, as described in conjunction of FIG. 5. FIG. 8B shows various views of generating another decorative ornament by employing a procedural model that iteratively places decorative elements along streamlines based on vector fields and cost functions, as described in conjunction of FIG. 5. FIG. 8C shows various views of generating another decorative ornament by employing a procedural model that iteratively places foreground and background decorative elements along streamlines based on user provided paths and cost functions, as described in conjunction of FIG. 5. FIG. 8D shows various views of generating yet another decorative ornament by employing a procedural model that iteratively places foreground and background decorative elements along streamlines based on user provided paths and cost functions, as described in conjunction of FIG. 5. FIG. 8E shows various views of generating still yet another decorative ornament by employing a procedural model that iteratively places foreground and background decorative elements along streamlines based on user provided paths and cost functions, as described in conjunction of FIG. 5. FIG. 8F shows various embodiments of updating a placement location when a potential collision with an obstacle within the ornament area is detected.

After a start block, process 550 begins at block 552, where a vector field is determined and/or generated over the ornament area. As discussed throughout, a vector field may be generated from seed data, image data, curves or paths provided by the user, or the like. In at least some embodiments, the vector field is included in a control layer of the global space organization function. A correspondence between the vector field and the locations included in the ornament area may be generated. In some embodiments, an affine transformation is employed to generate the correspondence.

In an exemplary embodiment, view 802 of FIG. 8A shows a vector field generated from a square provided by the user. In view 802, the inner square is used to generate a vector field, of a generally circular nature. The outer square provides a boundary for the generation of the decorative ornament. In some embodiments, the vector field may be generated based on the gradient of a scalar field, such as image (as discussed in the conjunction with at least FIG. 8B). View 812 of FIG. 8B shows image data that is employed to generate a vector field. One or more gradients of image data may be employed to generate a vector field that corresponds to the ornament area. In other embodiments, a vector field may be generated based on the divergence or the curl of another vector field defined over the ornament area.

In at least one embodiment, a gradient may be determined from image data, or some other 2D scalar field. The divergence or curl of such a gradient may be determined and employed to generate one or more decorative ornaments.

At block 554, a cost function over the ornament area may be determined and/or generated. A cost function may be included in the placement or connection policies. In at least one embodiment, the global space organization function may include a cost function. At discussed below, a cost function may be employed to determine one or more placement streamlines within the vector field. For instance, a cost function may bias the determination of the placement streamline as the longest streamline within the plurality of streamlines defined by the vector field over the ornament area.

At block 556, a placement streamline is determined based on the vector field and the cost function. A streamline may be defined for each location within the ornament area based on the vector field. Thus, the cost function may be employed to select or determine one of the plurality of streamlines defined by the vector field as a placement streamline. For instance, the cost function may select the longest streamline as the placement streamline. In some embodiments, the cost function may bias the selection to streamlines that do not cross themselves. In some embodiments, the cost function may determine a placement function that deviates from a streamline defined by the vector field. For instance, a placement streamline may vary from a vector field streamline, at least a portion of the locations along the vector streamline, based on the cost function. The cost function may define a cost for deviating from the vector streamline at each location.

In some embodiments, to determine the placement streamline, the cost function may be employed to determine which of the streamline either maximizes or minimizes the cost function along the streamline. In at least one embodiment, a path integral may be determined along each of the potential streamlines, where the cost function is integrated along the streamline. The placement streamline may be the streamline that maximizes or minimizes the path integral.

In some embodiments, the user may provide one or more anchor points or anchor locations in the seed data. The placement streamline may be constrained to pass through the one or more anchor points. In at least one embodiment, the placement streamline may pass through the anchor points, and be guided by the vector field. In some embodiments, the cost function may influence the path of the placement streamline between the one or more anchor points. The cost function and the vector field may balance streamline constraints. For instance, a potential streamline may include the shortest distance between two consecutive anchor points. Another potential streamline may be a streamline that passes through consecutive anchor points, based on the vector field. A cost function may determine a deviation from either of these two potential streamlines based on a cost at least location in the ornament area.

In at least some embodiments, a user may provide one or more streamline in the seed data. These seed streamlines may be employed as placement streamlines. In at least one embodiment, the cost function may be employed to determine a placement streamline that deviates or varies from the seed streamlines based on a cost. For instance, view 822 of FIG. 8C shows a seed streamline provided by a user that is employed as a placement streamline in the generation of a decorative ornament. Similarly, view 832 of FIG. 8D shows two seed streamlines provided by a user. View 832 also shows an arrow provided by the user. The seed arrow may be employed to determine a vector field at block 552. View 842 of FIG. 8E, shows multiple seed streamlines provided by a user. The streamlines of view 842 include concentric rectangles connected by line segments passing through corresponding corners of the concentric rectangles.

At block 558, the decorative elements are iteratively placed along placement streamline. View 802 of FIG. 8A shows the iterative placement of decorative elements along the placement streamline. In FIG. 8A, the cost function was used to determine the longest streamline in the vector field as the placement streamline. As shown in view 802, at block 558, connection elements may be iteratively place along the placement streamline to connect the decorative elements. Foreground elements may be placed along the placement streamline. In some embodiments, background elements may be placed along the placement streamline.

View 814 of FIG. 8B shows a decorative ornament generated by placing decorative elements along a plurality of placement streamlines. The placement streamlines in view 814 were determined based on the vector field generated by image data shown in view 812. In various embodiments, a gradient of the image data is employed to generate the vector field.

View 824 of FIG. 8C shows the placement of decorative elements along the seed streamline provided by the user in view 822. Similarly, view 834 of FIG. 8D shows a decorative ornament, where foreground elements are placed along the seed streamlines provided by the users in view 832. View 844 of FIG. 8E shows a decorative ornament generated by placing decorative elements along the streamlines provided by the user in view 842.

View 624 of UI 610 of FIG. 6 also shows a user providing a seed curve. The curve may be employed to generate one or more vector fields and/or a family of curves. View 678 of FIG. 6 shows some of the streamlines of the vector field generated from the user provided seed curve.

At decision block 560, it is determined whether another placement streamline is to be determined. For instance, additional streamlines may be determined to iteratively place additional decorative elements. Initially, foreground elements may be placed along one or more placement streamlines. Subsequent to placing the foreground elements, background elements may be placed along additional streamlines. If additional decorative elements are to be placed, process 550 flows to block 562. Otherwise, process 550 may terminate and/or return a calling process.

At block 562, the one or more cost functions may be updated based on the placement streamline. For instance, a cost function may be updated to bias the selection of subsequent placement streamlines to be generally parallel to one or more previous placement streamlines. For instance, the decorative ornament in view 814 of FIG. 8B shows the selection of generally parallel placement streamlines. In some embodiments, the cost function may be updated to bias the selection of subsequent placement streamlines to be generally orthogonal, or at least substantially transverse to one or more previous placement streamlines. View 826 of FIG. 8A demonstrates placement streamlines for the placement of background elements that are oriented generally transverse to the circular streamline where the foreground elements were placed.

Similarly, the decorative ornament of view 826 of FIG. 8C shows placement of foreground objects along a user-specified curve, and background objects to fill the remaining space. The decorative element of view 834 of FIG. 8D shows background placement streamlines that are generally orthogonal to the foreground placement curves. The arrow provided by the user in view 832 indicates the generation of the background streamlines that are generally orthogonal to the foreground paths. View 844 of FIG. 8E shows background placement streamlines that generally run across the inner and outer rectangles defined by the user in view 842.

In some embodiments, the cost function may be constrained to not cross user defined boundaries or other streamlines. For instance, the outermost rectangles if views 802, 804, and 806 of FIG. 8A is a boundary. The cost function may bias the selection of placement streamlines to not cross a boundary. As discussed in conjunction with FIG. 8F, a cost function may be employed to determine the placement of decorative elements or placement streamlines to avoid collisions with one or more boundaries. View 806 shows that a portion of the selection of streamlines crosses the boundary. Similarly, the innermost rectangle of view 842 of FIG. 8E is a boundary. The cost function is chosen so that placement streamlines do not cross the boundary.

Views 850, 860, and 870 of FIG. 8F show various embodiments for updating the iterative placements of decorative elements along streamlines that may collide with one or more obstacles. As discussed in conjunction with at least blocks 410 and 412 of process 400, when the initial determination of the location for the placement of a decorative element would result in a collision with an obstacle, such as a boundary, stencil, mask, or the like an alternative placement or placement streamline may be determined.

A collision policy may enable one or more shortest path processes to determine an alternative placement or streamline for the decorative elements. In one non-limiting embodiment, a shortest path search process, such as but not limited to an A* (A-star) search process, is employed to determine the shortest path around the obstacle. View 850 of FIG. 8F shows the employment of an A* search process to determine the shortest path around the obstacle. The two end points of the streamline populated by decorative elements may be anchor points included in the global control layer configuration or provided as seed data by the user. In some embodiments, one or more anchor points may be determined by one or more paths, such as but not limited to the seed curve shown in view 624 of FIG. 6. A shortest path process may determine the shortest path from the location that the collision is detected to an anchor point.

Accordingly, the one or more shortest path processes may be employed such that the placement of and/or connections between one or more decorative elements avoid collisions with one or more obstacles included in the connection policies. The shortest path process may employ one or more movement cost functions to determine the shortest path to an anchor point while avoid an obstacle. The movement cost function may be included in the one or more cost functions determined at block 554.

In at least some embodiments, a shortest path process may be a modified shortest path process that employs a modified movement cost function. A modified shortest path processes generates a modified placement path around one or more obstacles. Although not an optimized shortest path, the modified path around one or more obstacles may be more decorative and/or visually appealing than an optimized shortest path. Accordingly, such modified movement cost functions may generate an ornament that includes an aesthetic that is more consistent with the user's intentional design.

View 860 of FIG. 8F shows the employment of a modified shortest path process that includes a modified cost function. Rather than employing an unmodified movement cost function that minimizes the distance of a placement path around the obstacle (such as that shown in view 850), the modified cost functions pulls the updated placement path back toward the obstacle to provide the appearance that the decorative elements are "growing" around the object. As a comparison between views 850 and 860 shows, such a modified movement cost function decreases the distance between the boundary of the obstacle and the updated location or the placement path for the decorative elements. Such a modified movement cost function may be based on a distance from the obstacle for each location. In at least one embodiment, the movement cost function may be based on the distance to the direct, undistorted path to the goal. For instance, a modified cost function may be higher for locations that are further away from a nearest boundary of the obstacle than for locations that are closer to a boundary of the obstacle. View 870 shows the results of updating the placement location or placement path for the decorative elements when three obstacles are included in the global control layer configuration.

Illustrative Operating Environment

Figure 9:
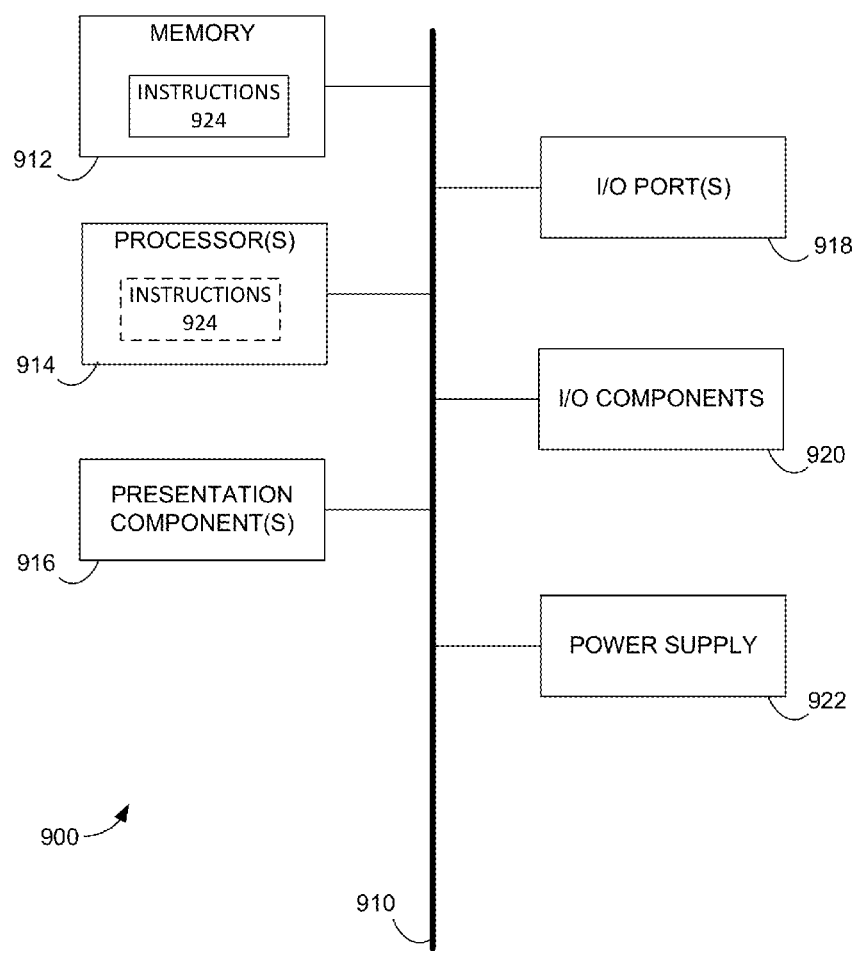
FIG. 9 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 9, an illustrative operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 9, computing device 900 includes a bus 910 that directly or indirectly couples the following devices: memory 912, one or more processors 914, one or more presentation components 916, input/output ports 918, input/output components 920, and an illustrative power supply 922. Bus 910 represents what may be one or more busses (such as an address bus, data bus, or combination thereof). Although the various blocks of FIG. 9 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 9 is merely illustrative of an example computing device that can be used in connection with one or more embodiments of the present disclosure. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. As depicted, memory 912 includes instructions 924. Instructions 924, when executed by processor(s) 914 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 900 includes one or more processors that read data from various entities such as memory 912 or I/O components 920. Presentation component(s) 916 present data indications to a user or other device. Illustrative presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. One or more computer-readable storage media having instructions stored thereon for generating a procedural ornamentation within an area that includes a plurality of ornamentation locations, which, when executed by one or more processors of a computing device cause the computing device to perform actions comprising:

configuring a global space organization function to generate a placement value, corresponding to a placement preference, for each of the plurality of ornamentation locations, wherein the global space organization function is configured based on at least one design preference for the procedural ornamentation that includes at least a vector field and a first location for a first instance of a decorative element;

placing the first instance of the decorative element at the first location of the plurality of ornamentation locations;

updating the global space organization function based on the placement of the first instance of the decorative element at the first location, wherein the updating includes configuring the global space organization function to generate an updated placement value for each of the plurality of ornamentation locations that is based on a first distance from the first location, the vector field, and a second distance to a boundary that defines the area;

determining a second location included in the plurality of ornamentation locations based on the updated global space organization function, wherein the updated placement value for the second location is at least as large as the updated placement values for each of the plurality of ornamentation locations; and placing a second instance of the decorative element at the second location; and outputting the procedural ornamentation to a user via a display device coupled with the computing device, wherein the procedural ornamentation includes the first instance of the decorative element placed at the first location and the second instance of the decorative element placed at the second location.

2. The one or more computer-readable storage media of claim 1, wherein updating the global space organization function is further based on other locations of the plurality of ornamentation locations that include other instances of the decorative element.

3. The one or more computer-readable storage media of claim 1,
wherein the procedural ornamentation comprises a plurality of instances of the decorative element, the plurality of instances including at least the first and the second instances of the decorative element at a subset of the plurality of ornamentation locations and wherein the actions further comprise:
receiving a local edit user input to the procedural ornamentation; and
in response to receiving the local edit user input, updating at least a portion of the subset of the plurality of ornamentation locations based on at least the local edit user input and the updated global space organization function.

4. The one or more computer-readable storage media of claim 1, wherein the vector field indicates a desired direction of a next instance of the decorative element, the vector field specified separate from the first location.

5. The one or more computer-readable storage media of claim 1, wherein the global space organization function includes a fitness function that is employed to determine at least one streamline in a flow field.

6. The one or more computer-readable storage media of claim 1,
wherein the actions further comprise:
aligning image data over the area; and
configuring the global space organization function based on at least one characteristic of the aligned image data.

7. The one or more computer-readable storage media of claim 6, wherein the at least one characteristic of the aligned image data includes any of a brightness or a color of the image data.

8. The one or more computer-readable storage media of claim 1, wherein the actions further comprise:
employing the global space organization function to determine at least one aspect of at least the second instance of the decorative element, wherein the at least one aspect includes at least one of a size of the second instance of the decorative element, an orientation of the second instance of the decorative element, a color of the second instance of the decorative element, or a distance between the second location and the first location.

9. The one or more computer-readable storage media of claim 1, wherein the placement value for the second location corresponds to a desirability of a placement of the second instance of the decorative element at the second location.

10. A procedural model engine for generating a decorative ornament within an area that includes a plurality of locations, comprising:
a means for receiving a seed location that is included in the plurality of locations;
a means for receiving a configuration for a global space organization function, wherein the global space organization function generates at least one placement value corresponding to a placement preference at each of the plurality of locations, wherein the global space organization function is based on one or more design preferences for the decorative ornament that includes at least a vector field and the seed location;
a means for iteratively determining a subset of the plurality of locations based on the configured global space organization function, wherein the subset of the plurality of locations includes at least the seed location and subsets of the plurality of locations is based on a first distance from the seed location and a second distance to a boundary that defines the area;
a means for providing the decorative ornament for display to the user, wherein the decorative ornament includes a plurality of decorative elements positioned at the subset of the plurality of locations;
a means for updating the decorative ornament, in response to the user providing at least one local edit for the decorative ornament, such that at least a portion of the plurality of decorative elements are re-positioned at another subset of the plurality of locations based on the local edit and the vector field; and
a means for providing the updated decorative element to the user.

11. The procedural model engine of claim 10, wherein the configuration of the global space organization function is based on a user-provided input and is employed to iteratively determine the subset of the plurality of locations.

12. The procedural model engine of claim 10, wherein the configuration of the global space organization function includes a fitness function that is employed to determine a streamline in a flow field.

13. The procedural model engine of claim 10, further comprising: a means for receiving image data;
a means for updating the configuration of the global space organization function based on the image data; and
a means for determining the seed location based on the image data and the updated configuration of the global space organization function.

14. The procedural model engine of claim 10, wherein a portion of the subset of the plurality of locations are further based on at least one stochastic determination.

15. A computing system for generating at least one decorative ornament, within an area that includes a plurality of locations, based on design preferences, comprising:
an ornament generation engine configured to:
determine a global space organization function that generates at least one placement value, corresponding to a placement preference, for each of the plurality of locations based on an external input, wherein the global space organization function is configured based on at least one design preference for the decorative ornament that includes at least a vector field and a first location, and the placement values for each of the plurality of locations is based on a first distance from the first location of a first instance of a decorative element, the vector field and a second distance to a boundary that defines the area;

determine a ranked subset of the plurality of locations, wherein determining a second location included in the subset of the plurality of locations is based on a comparison between an evaluation of the global space organization function at the second location, the vector field and an evaluation of the global space organization function at the first location included in the subset of the plurality of locations that is ranked higher than the first location; and generate the ornament by positioning at least one decorative element at each of the subset of the plurality of locations, wherein at least one aspect of the at least one decorative element is based on the global space organization function.

16. The computing system of claim 15, wherein the ornament generation engine is further configured to:

determine a correspondence between each of the plurality of locations and image data;

determine a global space organization function based on the correspondence between each of the plurality of location and the image data.

17. The computing system of claim 15, wherein the at least one aspect of the at least one decorative element includes at least one of a size, an orientation, or a color of the at least one decorative element.

18. The computing system of claim 15, wherein the placement data includes image data and the ornament generation engine is further configured to:

determine the vector field in the area based on the image data; and determine at least one streamline in the vector field based on a fitness function.

19. The computing system of claim 15, wherein the ornament engine is further configured to:

employ the global space organization function to determine at least one guide path based at least in part on the vector field, wherein each of the subset of the plurality of locations are included on the at least one guide path.

20. The computing system of claim 15, wherein the external input includes at least one of a curve provided by a user, a control layer including the vector field, or image data.

* * * * *